US012581063B2

(12) United States Patent
Lim

(10) Patent No.: US 12,581,063 B2
(45) Date of Patent: Mar. 17, 2026

(54) IMAGE ENCODING/DECODING METHOD AND APPARATUS

(71) Applicant: KT CORPORATION, Gyeonggi-do (KR)

(72) Inventor: Sung Won Lim, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 5 days.

(21) Appl. No.: 18/848,707

(22) PCT Filed: Mar. 20, 2023

(86) PCT No.: PCT/KR2023/003678
§ 371 (c)(1),
(2) Date: Sep. 19, 2024

(87) PCT Pub. No.: WO2023/182751
PCT Pub. Date: Sep. 28, 2023

(65) Prior Publication Data
US 2025/0220156 A1     Jul. 3, 2025

(30) Foreign Application Priority Data

Mar. 21, 2022     (KR) ........................ 10-2022-0034875

(51) Int. Cl.
*H04N 7/12*         (2006.01)
*H04N 19/105*     (2014.01)
*H04N 19/159*     (2014.01)
*H04N 19/176*     (2014.01)

(52) U.S. Cl.
CPC ......... *H04N 19/105* (2014.11); *H04N 19/159* (2014.11); *H04N 19/176* (2014.11)

(58) Field of Classification Search
CPC .................................................. H04N 19/186
See application file for complete search history.

(56) References Cited

U.S. PATENT DOCUMENTS

| | | | |
|---|---|---|---|
| 2020/0195930 A1 | 6/2020 | Choi et al. |
| 2021/0084305 A1 | 3/2021 | Choi et al. |
| 2021/0092396 A1 | 3/2021 | Zhang et al. |
| 2021/0337188 A1 | 10/2021 | Chen et al. |
| 2022/0053192 A1 | 2/2022 | Zhang et al. |
| 2022/0070491 A1 | 3/2022 | Yasugi et al. |
| 2022/0256142 A1 | 8/2022 | Chen et al. |

(Continued)

FOREIGN PATENT DOCUMENTS

| | | |
|---|---|---|
| KR | 10-2021-0006993 A | 1/2021 |
| KR | 10-2021-0079254 A | 6/2021 |

(Continued)

OTHER PUBLICATIONS

Korean Intellectual Property Office, International Search Report of International Application No. PCT/KR2023/003678, Jun. 29, 2023.

(Continued)

*Primary Examiner* — Y Lee
(74) *Attorney, Agent, or Firm* — IP Legal Services, LLC

(57)     ABSTRACT

An image encoding/decoding method according to the present invention comprises deriving an initial prediction parameter for a chroma block; adjusting the initial prediction parameter; and obtaining a prediction block for the chroma block, on the basis of the adjusted prediction parameter and a reconstructed luma block.

15 Claims, 17 Drawing Sheets

(56) References Cited

U.S. PATENT DOCUMENTS

| | | | |
|---|---|---|---|
| 2022/0272351 A1 | 8/2022 | Choi et al. | |
| 2022/0329784 A1 | 10/2022 | Chen et al. | |
| 2022/0368944 A1 | 11/2022 | Yasugi et al. | |
| 2023/0345042 A1 | 10/2023 | Yasugi et al. | |
| 2024/0015298 A1 | 1/2024 | Zhang et al. | |
| 2024/0048714 A1 | 2/2024 | Choi et al. | |
| 2024/0137489 A1 | 4/2024 | Chen et al. | |
| 2024/0137495 A1 | 4/2024 | Chen et al. | |
| 2024/0187646 A1 | 6/2024 | Yasugi et al. | |

FOREIGN PATENT DOCUMENTS

| | | |
|---|---|---|
| KR | 10-2021-0094126 A | 7/2021 |
| WO | 2020/053804 A1 | 3/2020 |

OTHER PUBLICATIONS

Korean Intellectual Property Office, Written Opinion of International Application No. PCT/KR2023/003678, Jun. 29, 2023.

REFERENCE SAMPLE

PREDICTION SAMPLE

REFERENCE SAMPLE

PREDICTION SAMPLE

INTEGER POSITION REFERENCE SAMPLE

FRACTIONAL POSITION REFERENCE SAMPLE (a)                                    (b)

FIG. 10

| intra prediction mode | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|
| tanθ × 32 | X | X | 32 | 29 | 26 | 23 | 20 | 18 | 16 | 14 | 12 | 10 | 8 | 6 | 4 | 3 | 2 | 1 | 0 | -1 | -2 | -3 | -4 |

| intra prediction mode | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 |
|---|---|---|---|---|---|---|---|---|---|---|---|---|---|---|---|---|---|---|---|---|---|---|
| tanθ × 32 | -6 | -8 | -10 | -12 | -14 | -16 | -18 | -20 | -23 | -26 | -29 | -32 | -29 | -26 | -23 | -20 | -18 | -16 | -14 | -12 | -10 | -8 | -6 |

| intra prediction mode | 46 | 47 | 48 | 49 | 50 | 51 | 52 | 53 | 54 | 55 | 56 | 57 | 58 | 59 | 60 | 61 | 62 | 63 | 64 | 65 | 66 | | |
|---|---|---|---|---|---|---|---|---|---|---|---|---|---|---|---|---|---|---|---|---|---|---|---|
| tanθ × 32 | -4 | -3 | -2 | -1 | 0 | 1 | 2 | 3 | 4 | 6 | 8 | 10 | 12 | 14 | 16 | 18 | 20 | 23 | 26 | 29 | 32 | | |

FIG. 11

| Intra prediction mode | -14 | -13 | -12 | -11 | -10 | -9 | -8 | -7 | -6 | -5 | -4 | -3 | -2 | -1 |
|---|---|---|---|---|---|---|---|---|---|---|---|---|---|---|
| tanθ × 32 | 512 | 341 | 256 | 171 | 128 | 102 | 86 | 73 | 64 | 57 | 51 | 45 | 39 | 35 |
| Intra prediction mode | 67 | 68 | 69 | 70 | 71 | 72 | 73 | 74 | 75 | 76 | 77 | 78 | 79 | 80 |
| tanθ × 32 | 35 | 39 | 45 | 51 | 57 | 64 | 73 | 86 | 102 | 128 | 171 | 256 | 341 | 512 |

⬤ Reference sample
◔ Prediction sample
◍ Reference sample generated through interpolation
⟶ Projection for interpolation
⟹ Prediction direction in directional mode Reference sample Prediction sample Reference sample generated through interpolation → Prediction direction in directional mode

FIG. 17

● Position where downsampling
   is performed

Luma block

FIG. 19

Luma reference sample

Luma sample

Luma block

Initial prediction parameter (a)

Adjusted prediction parameter (b)

Initial prediction parameter by group (a)

Adjusted prediction parameter by group (b)

◉ Chroma reference sample

◐ Chroma reference sample to be generated

IMAGE ENCODING/DECODING METHOD AND APPARATUS

CROSS REFERENCE TO RELATED APPLICATIONS

This application is a National Stage Patent Application of PCT International Patent Application No. PCT/KR2023/003678 (filed on Mar. 20, 2023) under 35 U.S.C. § 371, which claims priority to Korean Patent Application No. 10-2022-0034875 (filed on Mar. 21, 2022), the teachings of which are incorporated herein in their entireties by reference.

TECHNICAL FIELD

The present disclosure relates to a method and a device for processing an image signal.

BACKGROUND ART

Recently, demands for high-resolution and high-quality images such as HD (High Definition) images and UHD (Ultra High Definition) images have increased in a variety of application fields. As image data becomes high-resolution and high-quality, the volume of data relatively increases compared to the existing image data, so when image data is transmitted by using media such as the existing wire and wireless broadband circuit or is stored by using the existing storage medium, expenses for transmission and expenses for storage increase. High efficiency image compression technologies may be utilized to resolve these problems which are generated as image data becomes high-resolution and high-quality.

There are various technologies such as an inter prediction technology which predicts a pixel value included in a current picture from a previous or subsequent picture of a current picture with an image impression technology, an intra prediction technology which predicts a pixel value included in a current picture by using pixel information in a current picture, an entropy encoding technology which assigns a short sign to a value with high appearance frequency and assigns a long sign to a value with low appearance frequency and so on, and image data may be effectively compressed and transmitted or stored by using these image compression technologies.

On the other hand, as demands for a high-resolution image have increased, demands for stereo-scopic image contents have increased as a new image service. A video compression technology for effectively providing high-resolution and ultra high-resolution stereo-scopic image contents has been discussed.

DISCLOSURE

Technical Problem

The purpose of the present disclosure is to provide a method and device for predicting a chroma block by using a reconstructed luma block in encoding/decoding an image signal.

The purpose of the present disclosure is to provide a method and device for predicting a chroma block based on the linearity of a luma component and a chroma component in encoding/decoding an image signal.

Technical effects of the present disclosure may be non-limited by the above-mentioned technical effects, and other unmentioned technical effects may be clearly understood from the following description by those having ordinary skill in the technical field to which the present disclosure pertains.

Technical Solution

An image decoding method according to the present disclosure includes deriving an initial prediction parameter for a chroma block; adjusting the initial prediction parameter; and obtaining a prediction block for the chroma block based on the adjusted prediction parameter and a reconstructed luma block.

An image encoding method according to the present disclosure includes deriving an initial prediction parameter for a chroma block; adjusting the initial prediction parameter; and obtaining a prediction block for the chroma block based on the adjusted prediction parameter and a reconstructed luma block.

In an image decoding/encoding method according to the present disclosure, the adjusted prediction parameter may be derived through a parameter adjustment offset.

In an image decoding/encoding method according to the present disclosure, the initial prediction parameter includes an initial weight, and an adjusted weight may be derived by adding the parameter adjustment offset to the initial weight.

In an image decoding/encoding method according to the present disclosure, the initial prediction parameter further includes an initial offset, and an adjusted weight may be derived by adding a difference value obtained by multiplying an average value, the minimum value, the maximum value or a median value of the luma reference samples and the parameter adjustment offset to the initial weight.

In an image decoding/encoding method according to the present disclosure, the parameter adjustment offset is determined based on an index indicating one of a plurality of parameter adjustment offset candidates, and the index may be explicitly signaled through a bitstream.

In an image decoding/encoding method according to the present disclosure, when one of a plurality of parameter adjustment offset candidate sets is selected for a current block, the parameter adjustment offset is selected from the plurality of parameter adjustment offset candidates included in the selected parameter adjustment offset candidate set, and one of the plurality of parameter adjustment offset candidate sets may be selected based on at least one of a size, a shape, a quantization parameter or an image format of the current block.

In an image decoding/encoding method according to the present disclosure, the initial prediction parameter is derived based on down-sampled luma reference samples in a reference region adjacent to the luma block and chroma reference samples in a reference region adjacent to the chroma block, and a position where a down-sampling filter is applied in a reference region of the luma block may be determined based on a cost of each position where a down-sampling filter is applicable.

The purpose of the present disclosure is to provide a method and device for predicting a chroma block by using a reconstructed luma block in encoding/decoding an image signal.

The purpose of the present disclosure is to provide a method and device for predicting a chroma block based on the linearity of a luma component and a chroma component in encoding/decoding an image signal.

In an image decoding/encoding method according to the present disclosure, the down-sampled luma reference samples are classified into a plurality of groups, and for each of the plurality of groups, the initial prediction parameter and the adjusted prediction parameter may be obtained.

In an image decoding/encoding method according to the present disclosure, a parameter adjustment offset may be independently determined for each of the plurality of groups.

A computer-readable recording medium that stores a bitstream encoded by an image encoding method according to the present disclosure may be provided.

Technical Effects

According to the present disclosure, encoding/decoding efficiency may be improved by predicting a chroma block by using a reconstructed luma block.

According to the present disclosure, accuracy of intra prediction may be improved by predicting a chroma block based on the linearity of a luma component and a chroma component.

Effects obtainable from the present disclosure are not limited to the above-mentioned effects and other unmentioned effects may be clearly understood from the following description by those having ordinary skill in the technical field to which the present disclosure pertains.

BRIEF DESCRIPTION OF DRAWINGS

FIG. 1 is a block diagram showing an image encoding device according to an embodiment of the present disclosure.

FIG. 2 is a block diagram showing an image decoding device according to an embodiment of the present disclosure.

FIGS. 10 and 11 show that a tangent value for an angle is scaled 32 times per intra prediction mode.

FIGS. 16 to 18 show an example in which a luma block is down-sampled.

FIG. 19 is a diagram for describing an example related to a position where down-sampling is applied.

MODE FOR INVENTION

Figure 3:
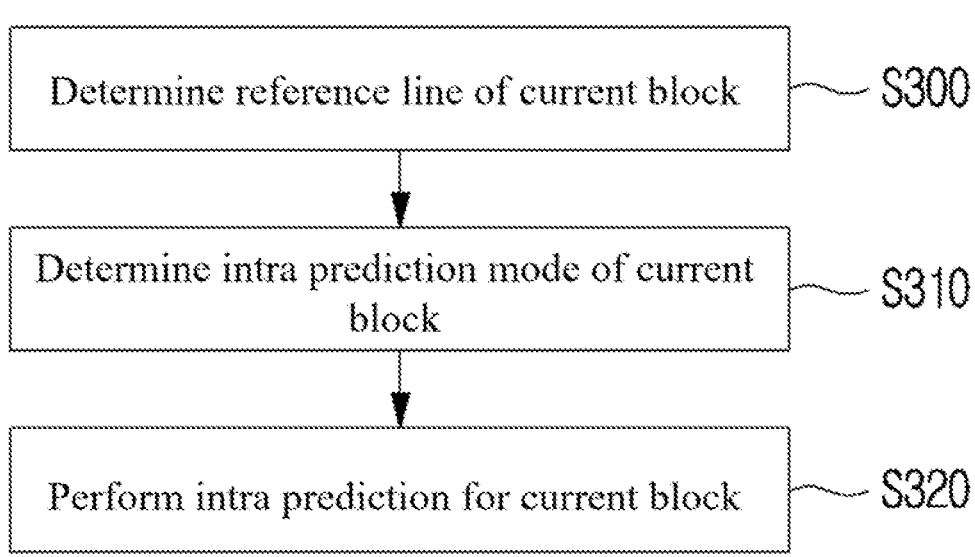
FIG. 3 shows an image encoding/decoding method performed by an image encoding/decoding device according to the present disclosure.

As the present disclosure may make various changes and have several embodiments, specific embodiments will be illustrated in a drawing and described in detail. But, it is not intended to limit the present disclosure to a specific embodiment, and it should be understood that it includes all changes, equivalents or substitutes included in an idea and a technical scope for the present disclosure. A similar reference numeral was used for a similar component while describing each drawing.

A term such as first, second, etc. may be used to describe various components, but the components should not be limited by the terms. The terms are used only to distinguish one component from other components. For example, without going beyond a scope of a right of the present disclosure, a first component may be referred to as a second component and similarly, a second component may be also referred to as a first component. A term of and/or includes a combination of a plurality of relative entered items or any item of a plurality of relative entered items.

When a component is referred to as being "linked" or "connected" to other component, it should be understood that it may be directly linked or connected to that other component, but other component may exist in the middle. On the other hand, when a component is referred to as being "directly linked" or "directly connected" to other component, it should be understood that other component does not exist in the middle.

As terms used in this application are just used to describe a specific embodiment, they are not intended to limit the present disclosure. Expression of the singular includes expression of the plural unless it clearly has a different meaning contextually. In this application, it should be understood that a term such as "include" or "have", etc. is to designate the existence of characteristics, numbers, steps, motions, components, parts or their combinations entered in the specification, but is not to exclude a possibility of addition or existence of one or more other characteristics, numbers, steps, motions, components, parts or their combinations in advance.

Hereinafter, referring to the attached drawings, a desirable embodiment of the present disclosure will be described in more detail. Hereinafter, the same reference numeral is used for the same component in a drawing and an overlapping description for the same component is omitted.

Figure 1:
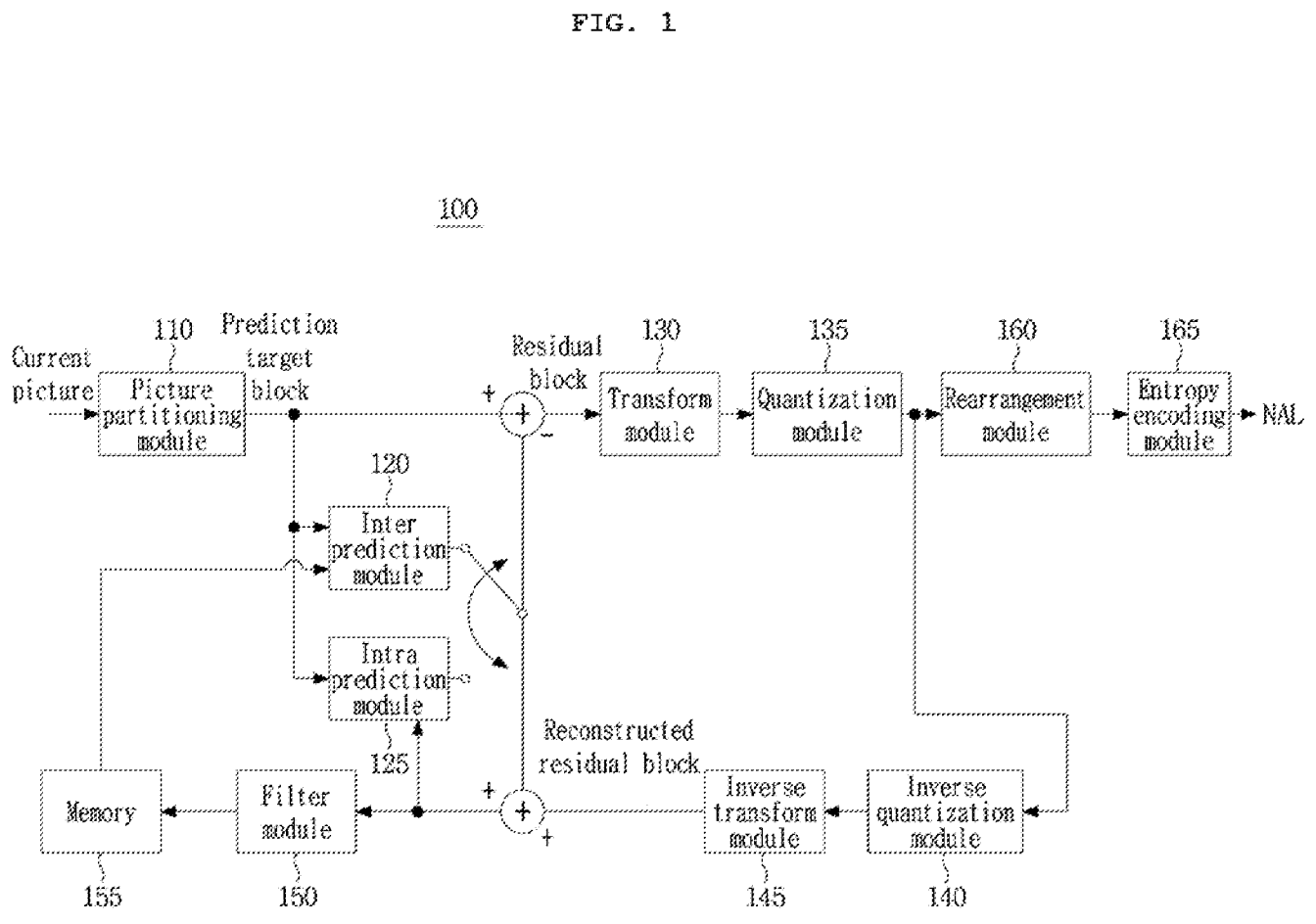

FIG. 1 is a block diagram showing an image encoding device according to an embodiment of the present disclosure.

Referring to FIG. 1, an image encoding device 100 may include a picture partitioning unit 110, prediction units 120 and 125, a transform unit 130, a quantization unit 135, a rearrangement unit 160, an entropy encoding unit 165, a dequantization unit 140, an inverse-transform unit 145, a filter unit 150, and a memory 155.

As each construction unit shown in FIG. 1 is independently shown to represent different characteristic functions in an image encoding device, it does not mean that each construction unit is constituted by separated hardware or one software unit. That is, as each construction unit is included by being enumerated as each construction unit for convenience of a description, at least two construction units of each construction unit may be combined to constitute one construction unit or one construction unit may be partitioned into a plurality of construction units to perform a function, and even an integrated embodiment and a separated embodiment of each construction unit are also included in a scope of a right of the present disclosure unless they are departing from the essence of the present disclosure.

Further, some components may be just an optional component for improving performance, not a necessary component which perform an essential function in the present disclosure. The present disclosure may be implemented by including only a construction unit necessary for implementing the essence of the present disclosure excluding a component used to just improve performance, and a structure including only a necessary component excluding an optional component used to just improve performance is also included in a scope of a right of the present disclosure.

A picture partitioning unit 110 may partition an input picture into at least one processing unit. In this case, a processing unit may be a prediction unit (PU), a transform unit (TU) or a coding unit (CU). In a picture partitioning unit 110, one picture may be partitioned into a combination of a plurality of coding units, prediction units and transform units and a picture may be encoded by selecting a combination of one coding unit, prediction unit and transform unit according to a predetermined standard (e.g., a cost function).

For example, one picture may be partitioned into a plurality of coding units. In order to partition a coding unit in a picture, a recursive tree structure such as a quad tree may be used, and a coding unit which is partitioned into other coding units by using one image or the largest coding unit as a route may be partitioned with as many child nodes as the number of partitioned coding units. A coding unit which is no longer partitioned according to a certain restriction becomes a leaf node. In other words, when it is assumed that only square partitioning is possible for one coding unit, one coding unit may be partitioned into up to four other coding units.

Hereinafter, in an embodiment of the present disclosure, a coding unit may be used as a unit for encoding or may be used as a unit for decoding.

A prediction unit may be partitioned with at least one square or rectangular shape, etc. in the same size in one coding unit or may be partitioned so that any one prediction unit of prediction units partitioned in one coding unit can have a shape and/or a size different from another prediction unit.

When a prediction unit for which intra prediction is performed based on a coding unit is generated and it is not the minimum coding unit, intra prediction may be performed without being partitioned into a plurality of prediction units N×N.

Prediction units 120 and 125 may include an inter prediction unit 120 performing inter prediction and an intra prediction unit 125 performing intra prediction. Whether to perform inter prediction or intra prediction for a coding unit may be determined and detailed information according to each prediction method (e.g., an intra prediction mode, a motion vector, a reference picture, etc.) may be determined. In this case, a processing unit that prediction is performed may be different from a processing unit that a prediction method and details are determined. For example, a prediction method, a prediction mode, etc. may be determined in a prediction unit and prediction may be performed in a transform unit. A residual value (a residual block) between a generated prediction block and an original block may be input to a transform unit 130. In addition, prediction mode information, motion vector information, etc. used for prediction may be encoded with a residual value in an entropy encoding unit 165 and may be transmitted to a decoding device. When a specific encoding mode is used, an original block may be encoded as it is and transmitted to a decoding unit without generating a prediction block through prediction units 120 or 125.

An inter prediction unit 120 may predict a prediction unit based on information on at least one picture of a previous picture or a subsequent picture of a current picture, or in some cases, may predict a prediction unit based on information on some encoded regions in a current picture. An inter prediction unit 120 may include a reference picture interpolation unit, a motion prediction unit and a motion compensation unit.

A reference picture interpolation unit may receive reference picture information from a memory 155 and generate pixel information equal to or less than an integer pixel in a reference picture. For a luma pixel, a 8-tap DCT-based interpolation filter having a different filter coefficient may be used to generate pixel information equal to or less than an integer pixel in a ¼ pixel unit. For a chroma signal, a 4-tap DCT-based interpolation filter having a different filter coefficient may be used to generate pixel information equal to or less than an integer pixel in a ⅛ pixel unit.

A motion prediction unit may perform motion prediction based on a reference picture interpolated by a reference picture interpolation unit. As a method for calculating a motion vector, various methods such as FBMA (Full search-based Block Matching Algorithm), TSS (Three Step Search), NTS (New Three-Step Search Algorithm), etc. may be used. A motion vector may have a motion vector value in a ½ or ¼ pixel unit based on an interpolated pixel. A motion prediction unit may predict a current prediction unit by varying a motion prediction method. As a motion prediction method, various methods such as a skip method, a merge method, an advanced motion vector prediction (AMVP) method, an intra block copy method, etc. may be used.

An intra prediction unit 125 may generate a prediction unit based on reference pixel information around a current block which is pixel information in a current picture. When a neighboring block in a current prediction unit is a block which performed inter prediction and accordingly, a reference pixel is a pixel which performed inter prediction, a reference pixel included in a block which performed inter prediction may be used by being replaced with reference pixel information of a surrounding block which performed intra prediction. In other words, when a reference pixel is unavailable, unavailable reference pixel information may be used by being replaced with at least one reference pixel of available reference pixels.

A prediction mode in intra prediction may have a directional prediction mode using reference pixel information according to a prediction direction and a non-directional mode not using directional information when performing prediction. A mode for predicting luma information may be different from a mode for predicting chroma information and intra prediction mode information used for predicting luma information or predicted luma signal information may be utilized to predict chroma information.

When a size of a prediction unit is the same as that of a transform unit in performing intra prediction, intra prediction for a prediction unit may be performed based on a pixel at a left position of a prediction unit, a pixel at a top-left position and a pixel at a top position. However, if a size of a prediction unit is different from a size of a transform unit when intra prediction is performed, intra prediction may be performed by using a reference pixel based on a transform unit. In addition, intra prediction using N×N partition may be used only for the minimum coding unit.

An intra prediction method may generate a prediction block after applying an adaptive intra smoothing (AIS) filter to a reference pixel according to a prediction mode. A type of an AIS filter applied to a reference pixel may be different. In order to perform an intra prediction method, an intra prediction mode in a current prediction unit may be predicted from an intra prediction mode in a prediction unit around a current prediction unit. When a prediction mode in a current prediction unit is predicted by using mode information predicted from a surrounding prediction unit, information that a prediction mode in a current prediction unit is the same as a prediction mode in a surrounding prediction unit may be transmitted by using predetermined flag information if an intra prediction mode in a current prediction unit is the same as an intra prediction mode in a surrounding prediction unit, and prediction mode information of a current block may be encoded by performing entropy encoding if a prediction mode in a current prediction unit is different from a prediction mode in a surrounding prediction unit.

In addition, a residual block may be generated which includes information on a residual value that is a difference value between a prediction unit which performed prediction based on a prediction unit generated in prediction units 120 and 125 and an original block in a prediction unit. A generated residual block may be input to a transform unit 130.

A transform unit 130 may transform an original block and a residual block including residual value information in a prediction unit generated through prediction units 120 and 125 by using a transform method such as DCT (Discrete Cosine Transform), DST (Discrete Sine Transform), KLT. Whether to apply DCT, DST or KLT to transform a residual block may be determined based on intra prediction mode information in a prediction unit used to generate a residual block.

A quantization unit 135 may quantize values transformed into a frequency domain in a transform unit 130. A quantization coefficient may be changed according to a block or importance of an image. A value calculated in a quantization unit 135 may be provided to a dequantization unit 140 and a rearrangement unit 160.

A rearrangement unit 160 may perform rearrangement of a coefficient value for a quantized residual value.

A rearrangement unit 160 may change a coefficient in a shape of a two-dimensional block into a shape of a one-dimensional vector through a coefficient scan method. For example, a rearrangement unit 160 may scan a DC coefficient to a coefficient in a high-frequency domain by using a zig-zag scan method and change it into a shape of a one-dimensional vector. According to a size of a transform unit and an intra prediction mode, instead of zig-zag scan, vertical scan where a coefficient in a shape of a two-dimensional block is scanned in a column direction or horizontal scan where a coefficient in a shape of a two-dimensional block is scanned in a row direction may be used. In other words, which scan method among zig-zag scan, vertical directional scan and horizontal directional scan will be used may be determined according to a size of a transform unit and an intra prediction mode.

An entropy encoding unit 165 may perform entropy encoding based on values calculated by a rearrangement unit 160. Entropy encoding, for example, may use various encoding methods such as exponential Golomb, CAVLC (Context-Adaptive Variable Length Coding), CABAC (Context-Adaptive Binary Arithmetic Coding).

An entropy encoding unit 165 may encode a variety of information such as residual value coefficient information and block type information in a coding unit, prediction mode information, partitioning unit information, prediction unit information and transmission unit information, motion vector information, reference frame information, block interpolation information, filtering information, etc. from a rearrangement unit 160 and prediction units 120 and 125.

An entropy encoding unit 165 may perform entropy encoding for a coefficient value in a coding unit which is input from a rearrangement unit 160.

A dequantization unit 140 and an inverse transform unit 145 dequantize values quantized in a quantization unit 135 and inversely transform values transformed in a transform unit 130. A residual value generated by a dequantization unit 140 and an inverse transform unit 145 may be combined with a prediction unit predicted by a motion prediction unit, a motion compensation unit and an intra prediction unit included in prediction units 120 and 125 to generate a reconstructed block.

A filter unit 150 may include at least one of a deblocking filter, an offset correction unit and an adaptive loop filter (ALF).

A deblocking filter may remove block distortion which is generated by a boundary between blocks in a reconstructed picture. In order to determine whether deblocking is performed, whether a deblocking filter will be applied to a current block may be determined based on a pixel included in several rows or columns included in a block. When a deblocking filter is applied to a block, a strong filter or a weak filter may be applied according to required deblocking filtering strength. In addition, in applying a deblocking filter, when horizontal filtering and vertical filtering are performed, horizontal directional filtering and vertical directional filtering may be set to be processed in parallel.

An offset correction unit may correct an offset with an original image in a unit of a pixel for an image that deblocking was performed. In order to perform offset correction for a specific picture, a region where an offset will be performed may be determined after dividing a pixel included in an image into the certain number of regions and a method in which an offset is applied to a corresponding region or a method in which an offset is applied by considering edge information of each pixel may be used.

Adaptive loop filtering (ALF) may be performed based on a value obtained by comparing a filtered reconstructed image with an original image. After a pixel included in an image is divided into predetermined groups, filtering may be discriminately performed per group by determining one filter which will be applied to a corresponding group. Information related to whether to apply ALF may be transmitted per coding unit (CU) for a luma signal and a shape and a filter coefficient of an ALF filter to be applied may vary according to each block. In addition, an ALF filter in the same shape (fixed shape) may be applied regardless of a characteristic of a block to be applied.

A memory 155 may store a reconstructed block or picture calculated through a filter unit 150 and a stored reconstructed block or picture may be provided to prediction units 120 and 125 when performing inter prediction.

Figure 2:
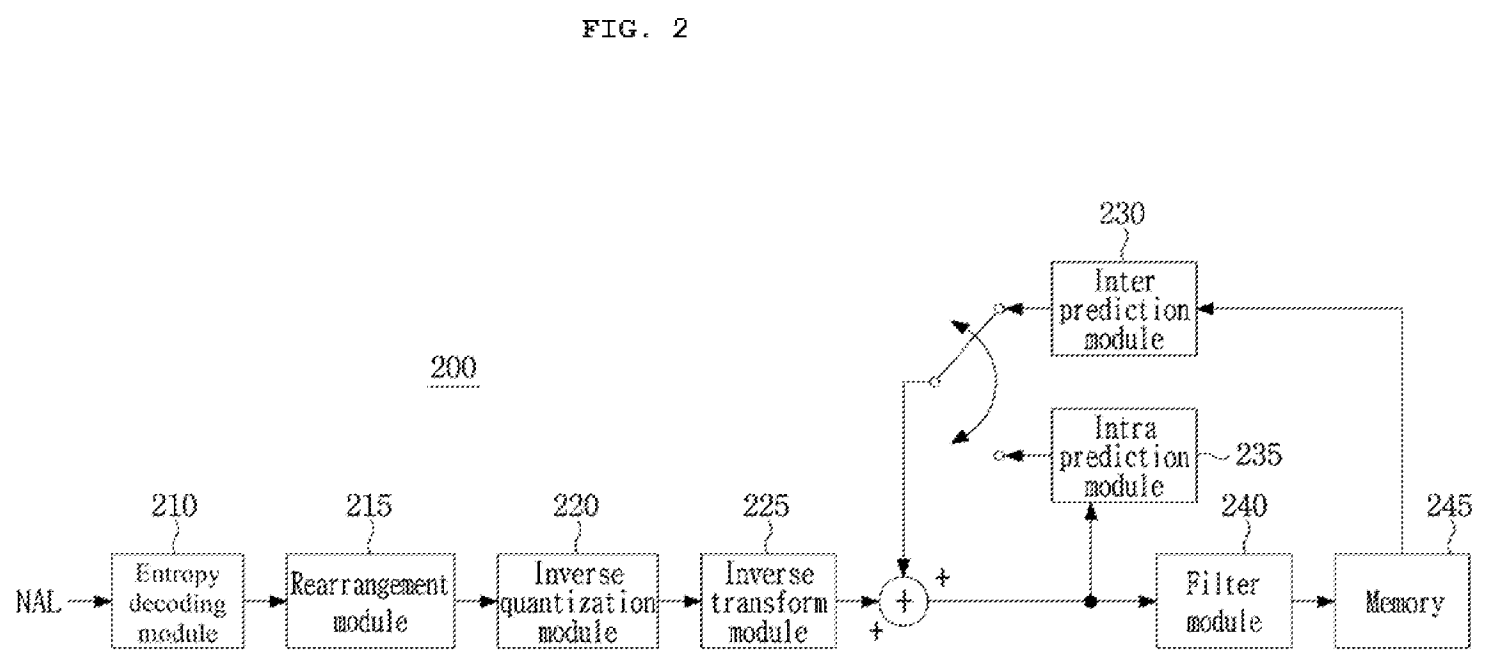

FIG. 2 is a block diagram showing an image decoding device according to an embodiment of the present disclosure.

Referring to FIG. 2, an image decoding device 200 may include an entropy decoding unit 210, a rearrangement unit 215, a dequantization unit 220, an inverse transform unit 225, prediction units 230 and 235, a filter unit 240, and a memory 245.

When an image bitstream is input from an image encoding device, an input bitstream may be decoded according to a procedure opposite to that of an image encoding device.

An entropy decoding unit 210 may perform entropy decoding according to a procedure opposite to a procedure in which entropy encoding is performed in an entropy encoding unit of an image encoding device. For example, in response to a method performed in an image encoding device, various methods such as Exponential Golomb, CAVLC (Context-Adaptive Variable Length Coding), CABAC (Context-Adaptive Binary Arithmetic Coding) may be applied.

An entropy decoding unit 210 may decode information related to intra prediction and inter prediction performed in an encoding device.

A rearrangement unit 215 may perform rearrangement based on a method that a bitstream entropy-decoded in an entropy decoding unit 210 is rearranged in an encoding unit. Coefficients expressed in a form of a one-dimensional vector may be rearranged by being reconstructed into coefficients in a form of a two-dimensional block. A rearrangement unit 215 may receive information related to coefficient scanning performed in an encoding unit and perform rearrangement through a method in which scanning is inversely performed based on scanning order performed in a corresponding encoding unit.

A dequantization unit 220 may perform dequantization based on a quantization parameter provided from an encoding device and a coefficient value of a rearranged block.

An inverse transform unit 225 may perform transform performed in a transform unit, i.e., inverse transform for DCT, DST, and KLT, i.e., inverse DCT, inverse DST and inverse KLT for a result of quantization performed in an image encoding device. Inverse transform may be performed based on a transmission unit determined in an image encoding device. In an inverse transform unit 225 of an image decoding device, a transform technique (for example, DCT, DST, KLT) may be selectively performed according to a plurality of information such as a prediction method, a size of a current block, a prediction mode, etc.

Prediction units 230 and 235 may generate a prediction block based on information related to generation of a prediction block provided from an entropy decoding unit 210 and pre-decoded block or picture information provided from a memory 245.

As described above, when a size of a prediction unit is the same as a size of a transform unit in performing intra prediction in the same manner as an operation in an image encoding device, intra prediction for a prediction unit may be performed based on a pixel at a left position of a prediction unit, a pixel at a top-left position and a pixel at a top position, but when a size of a prediction unit is different from a size of a transform unit in performing intra prediction, intra prediction may be performed by using a reference pixel based on a transform unit. In addition, intra prediction using N×N partitioning may be used only for the smallest coding unit.

Prediction units 230 and 235 may include a prediction unit determination unit, an inter prediction unit and an intra prediction unit. A prediction unit determination unit may receive a variety of information such as prediction unit information, prediction mode information of an intra prediction method, motion prediction-related information of an inter prediction method, etc. which are input from an entropy decoding unit 210, divide a prediction unit in a current coding unit and determine whether a prediction unit performs inter prediction or intra prediction. An inter prediction unit 230 may perform inter prediction for a current prediction unit based on information included in at least one picture of a previous picture or a subsequent picture of a current picture including a current prediction unit by using information necessary for inter prediction in a current prediction unit provided from an image encoding device. Alternatively, inter prediction may be performed based on information on some regions which are pre-reconstructed in a current picture including a current prediction unit.

In order to perform inter prediction, whether a motion prediction method in a prediction unit included in a corresponding coding unit is a skip mode, a merge mode, an AMVP mode, or an intra block copy mode may be determined based on a coding unit.

An intra prediction unit 235 may generate a prediction block based on pixel information in a current picture. When a prediction unit is a prediction unit which performed intra prediction, intra prediction may be performed based on intra prediction mode information in a prediction unit provided from an image encoding device. An intra prediction unit 235 may include an adaptive intra smoothing (AIS) filter, a reference pixel interpolation unit and a DC filter. As a part performing filtering on a reference pixel of a current block, an AIS filter may be applied by determining whether a filter is applied according to a prediction mode in a current prediction unit. AIS filtering may be performed for a reference pixel of a current block by using AIS filter information and a prediction mode in a prediction unit provided from an image encoding device. When a prediction mode of a current block is a mode which does not perform AIS filtering, an AIS filter may not be applied.

When a prediction mode in a prediction unit is a prediction unit which performs intra prediction based on a pixel value which interpolated a reference pixel, a reference pixel interpolation unit may interpolate a reference pixel to generate a reference pixel in a unit of a pixel equal to or less than an integer value. When a prediction mode in a current prediction unit is a prediction mode which generates a prediction block without interpolating a reference pixel, a reference pixel may not be interpolated. A DC filter may generate a prediction block through filtering when a prediction mode of a current block is a DC mode.

A reconstructed block or picture may be provided to a filter unit 240. A filter unit 240 may include a deblocking filter, an offset correction unit and an ALF.

Information on whether a deblocking filter was applied to a corresponding block or picture and information on whether a strong filter or a weak filter was applied when a deblocking filter was applied may be provided from an image encoding device. Information related to a deblocking filter provided from an image encoding device may be provided in a deblocking filter of an image decoding device and deblocking filtering for a corresponding block may be performed in an image decoding device.

An offset correction unit may perform offset correction on a reconstructed image based on offset value information, a type of offset correction, etc. applied to an image when performing encoding.

An ALF may be applied to a coding unit based on information on whether ALF is applied, ALF coefficient information, etc. provided from an encoding device. Such ALF information may be provided by being included in a specific parameter set.

A memory 245 may store a reconstructed picture or block for use as a reference picture or a reference block and provide a reconstructed picture to an output unit.

As described above, hereinafter, in an embodiment of the present disclosure, a coding unit is used as a term of a coding unit for convenience of a description, but it may be a unit which performs decoding as well as encoding.

In addition, as a current block represents a block to be encoded/decoded, it may represent a coding tree block (or a coding tree unit), a coding block (or a coding unit), a transform block (or a transform unit) or a prediction block (or a prediction unit), etc. according to an encoding/decoding step. In this specification, 'unit' may represent a base unit for performing a specific encoding/decoding process and 'block' may represent a pixel array in a predetermined size. Unless otherwise classified, 'block' and 'unit' may be used interchangeably. For example, in the after-described embodiment, it may be understood that a coding block (a coding block) and a coding unit (a coding unit) are used interchangeably.

FIG. 3 shows an image encoding/decoding method performed by an image encoding/decoding device according to the present disclosure.

Referring to FIG. 3, a reference line for intra prediction of a current block may be determined S300.

A current block may use one or more of a plurality of reference line candidates pre-defined in an image encoding/decoding device as a reference line for intra prediction. Here, a plurality of pre-defined reference line candidates may include a neighboring reference line adjacent to a current block to be decoded and N non-neighboring reference lines 1-sample to N-samples away from a boundary of a current block. N may be an integer of 1, 2, 3 or more. Hereinafter, for convenience of a description, it is assumed that a plurality of reference line candidates available for a current block consist of a neighboring reference line candidate and three non-neighboring reference line candidates, but it is not limited thereto. In other words, of course, a plurality of reference line candidates available for a current block may include four or more non-neighboring reference line candidates.

An image encoding device may determine an optimal reference line candidate among a plurality of reference line candidates and encode an index for specifying it. An image decoding device may determine a reference line of a current block based on an index signaled through a bitstream. The index may specify any one of a plurality of reference line candidates. A reference line candidate specified by the index may be used as a reference line of a current block.

The number of indexes signaled to determine a reference line of a current block may be 1, 2 or more. As an example, when the number of indexes signaled above is 1, a current block may perform intra prediction by using only a single reference line candidate specified by the signaled index among a plurality of reference line candidates. Alternatively, when the number of indexes signaled above is at least two, a current block may perform intra prediction by using a plurality of reference line candidates specified by a plurality of indexes among a plurality of reference line candidates.

Referring to FIG. 3, an intra prediction mode of a current block may be determined S310.

An intra prediction mode of a current block may be determined among a plurality of intra prediction modes pre-defined in an image encoding/decoding device. The plurality of pre-defined intra prediction modes are described by referring to FIGS. 4 and 5.

Figure 4:
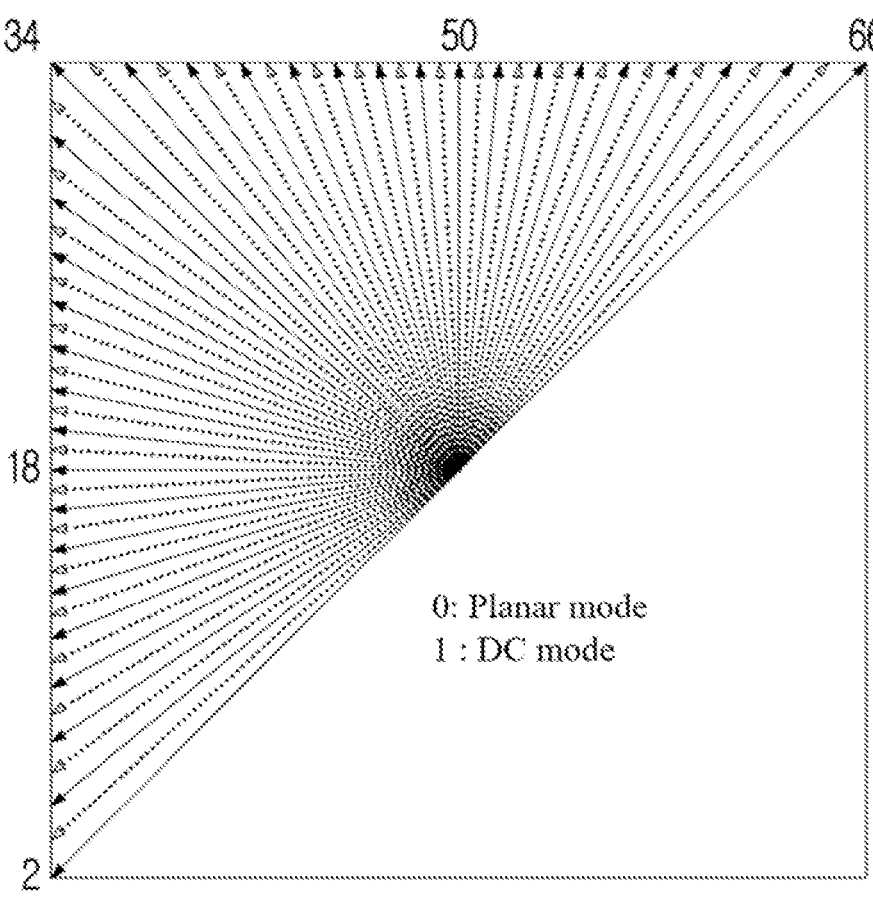
FIGS. 4 and 5 show an example of a plurality of intra prediction modes according to the present disclosure.

FIG. 4 shows an example of a plurality of intra prediction modes according to the present disclosure.

Referring to FIG. 4, a plurality of intra prediction modes pre-defined in an image encoding/decoding device may be composed of a non-directional mode and a directional mode. A non-directional mode may include at least one of a planar mode or a DC mode. A directional mode may include directional mode 2 to 66.

Figure 5:
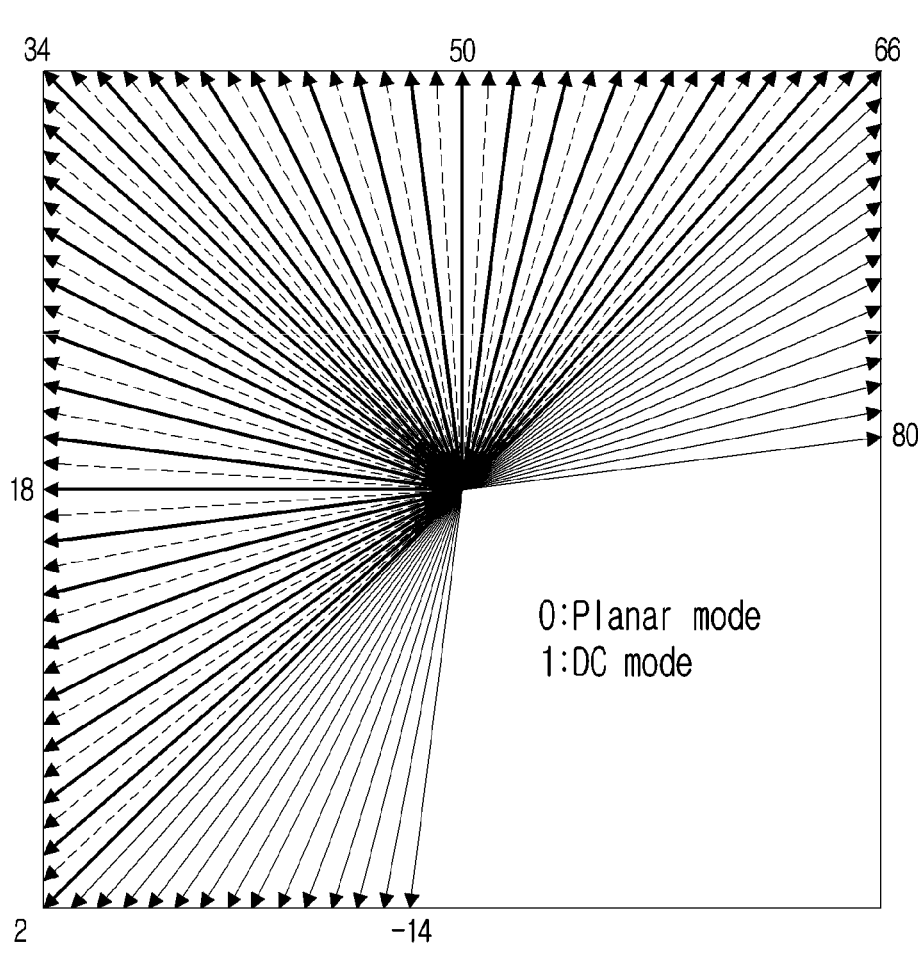

A directional mode may be expanded more than shown in FIG. 4. FIG. 5 shows an example in which a directional mode is expanded.

In FIG. 5, it was illustrated that mode −1 to mode −14 and mode 67 to mode 80 are added. These directional modes may be referred to as a wide-angle intra prediction mode. Whether to use a wide-angle intra prediction mode may be determined according to a shape of a current block. As an example, if a current block is a non-square block whose width is greater than a height, some directional modes (e.g., No. 2 to No. 15) may be transformed to a wide-angle intra prediction mode between No. 67 and No. 80. On the other hand, if a current block is a non-square block whose height is greater than a width, some directional modes (e.g., No. 53 to No. 66) may be transformed to a wide-angle intra prediction mode between No. −1 and No. −14.

A scope of available wide-angle intra prediction modes may be adaptively determined according to a width-to-height ratio of a current block. Table 1 shows a scope of available wide-angle intra prediction modes according to a width-to-height ratio of a current block.

TABLE 1

| Width/Height | Available wide-angle intra prediction mode range |
|---|---|
| W/H = 16 | 67~80 |
| W/H = 8 | 67~78 |
| W/H = 4 | 67~76 |
| W/H = 2 | 67~74 |
| W/H = 1 | None |
| W/H = ½ | −1~−8 |
| W/H = ¼ | −1~−10 |
| W/H = ⅛ | −1~−12 |
| W/H = 1/16 | −1~−14 |

Among the plurality of intra prediction modes, K candidate modes (most probable mode, MPM) may be selected. A candidate list including a selected candidate mode may be generated. An index indicating any one of candidate modes belonging to a candidate list may be signaled. An intra prediction mode of a current block may be determined based on a candidate mode indicated by the index. As an example, a candidate mode indicated by the index may be configured as an intra prediction mode of a current block. Alternatively, an intra prediction mode of a current block may be determined based on a value of a candidate mode indicated by the index and a predetermined difference value. The difference value may be defined as a difference between a value of an intra prediction mode of the current block and a value of a candidate mode indicated by the index. The difference value may be signaled through a bitstream. Alternatively, the difference value may be a value pre-defined in an image encoding/decoding device. Alternatively, an intra prediction mode of a current block may be determined based on a flag showing whether a mode identical to an intra prediction mode of a current block exists in the candidate list. As an example, when the flag is a first value, an intra prediction mode of a current block may be determined from the candidate list. In this case, an index indicating any one of a plurality of candidate modes belonging to a candidate list may be signaled. A candidate mode indicated by the index may be configured as an intra prediction mode of a current block. On the other hand, when the flag is a second value, any one of the remaining intra prediction modes may be configured as an intra prediction mode of a current block. The remaining intra prediction modes may refer to a mode excluding a candidate mode belonging to the candidate list among a plurality of pre-defined intra prediction modes. When the flag is a second value, an index indicating any one of the remaining intra prediction modes may be signaled. An intra prediction mode indicated by the signaled index may be configured as an intra prediction mode of a current block. An intra prediction mode of a chroma block may be selected among intra prediction mode candidates of a plurality of chroma blocks. To this end, index information indicating one of intra prediction mode candidates of a chroma block may be explicitly encoded and signaled through a bitstream. Table 2 illustrates intra prediction mode candidates of a chroma block.

generated through interpolation in a vertical direction. As an example, P2 may be generated by interpolating L with a reference sample positioned on the same vertical line as P2. A current sample in a current block may be predicted through a weighted sum of P1 and P2 as in Equation 3 below.

$$(\alpha \times P1 + \beta \times P2)/(\alpha + \beta) \qquad \text{[Equation 1]}$$

In Equation 1, weight $\alpha$ and $\beta$ may be determined by considering a width and a height of a current block. According to a width and a height of a current block, weight $\alpha$ and $\beta$ may have the same value or a different value. If a width and a height of a current block are the same, weight $\alpha$ and $\beta$ may be configured to be the same and a prediction sample of a current sample may be configured as an average value of P1 and P2. When a width and a height of a current block are not the same, weight $\alpha$ and $\beta$ may have a different value.

TABLE 2

| Intra Prediction Mode Candidate for Chroma Block | | | | | |
|---|---|---|---|---|---|
| Index | Luma Mode: 0 | Luma Mode: 50 | Luma Mode: 18 | Luma Mode: 1 | Others |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | | | DM | | |

In an example of Table 2, a direct mode (DM) refers to setting an intra prediction mode of a luma block existing at the same position as a chroma block as an intra prediction mode of a chroma block. As an example, if an intra prediction mode (a luma mode) of a luma block is No. 0 (a planar mode) and an index indicates No. 2, an intra prediction mode of a chroma block may be determined as a horizontal mode (No. 18). As an example, if an intra prediction mode (a luma mode) of a luma block is No. 1 (a DC mode) and an index indicates No. 0, an intra prediction mode of a chroma block may be determined as a planar mode (No. 0).

As a result, an intra prediction mode of a chroma block may be also set as one of intra prediction modes shown in FIG. 4 or FIG. 5. An intra prediction mode of a current block may be used to determine a reference line of a current block, and in this case, S310 may be performed before S300.

Referring to FIG. 3, intra prediction may be performed for a current block based on a reference line and an intra prediction mode of a current block S320.

Hereinafter, an intra prediction method per intra prediction mode is described in detail by referring to FIGS. 6 to 8. However, for convenience of a description, it is assumed that a single reference line is used for intra prediction of a current block, but even when a plurality of reference lines are used, an intra prediction method described later may be applied in the same/similar manner.

Figure 6:
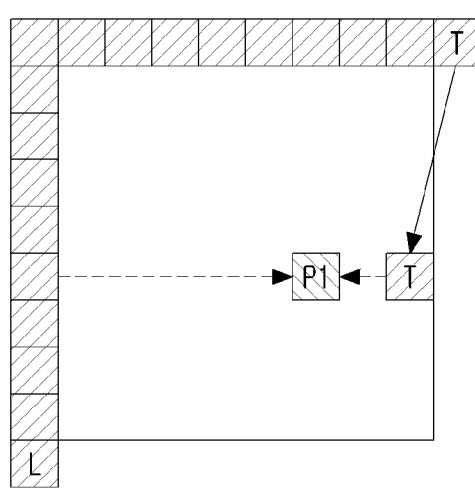
FIG. 6 shows an intra prediction method based on a planar mode according to the present disclosure.
Figure 6:
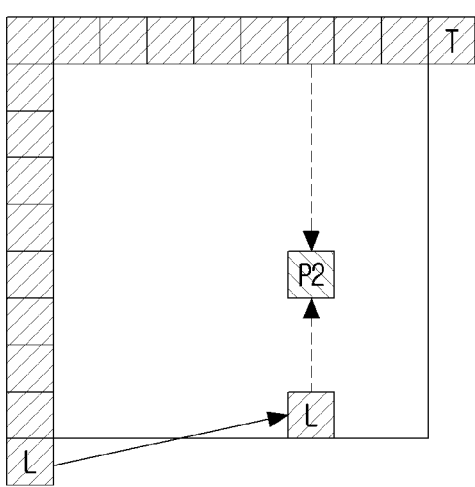

FIG. 6 shows an intra prediction method based on a planar mode according to the present disclosure.

Referring to FIG. 6, T represents a reference sample position at a top-right corner of a current block and L represents a reference sample positioned at a bottom-left corner of a current block. P1 may be generated through interpolation in a horizontal direction. As an example, P1 may be generated by interpolating T with a reference sample positioned on the same horizontal line as P1. P2 may be As an example, when a width is greater than a height, a smaller value may be configured to a weight corresponding to a width of a current block and a larger value may be configured to a weight corresponding to a height of a current block. Conversely, when a width is greater than a height, a larger value may be configured to a weight corresponding to a width of a current block and a smaller value may be configured to a weight corresponding to a height of a current block. Here, a weight corresponding to a width of a current block may refer to $\beta$ and a weight corresponding to a height of a current block may refer to $\alpha$.

Figure 7:
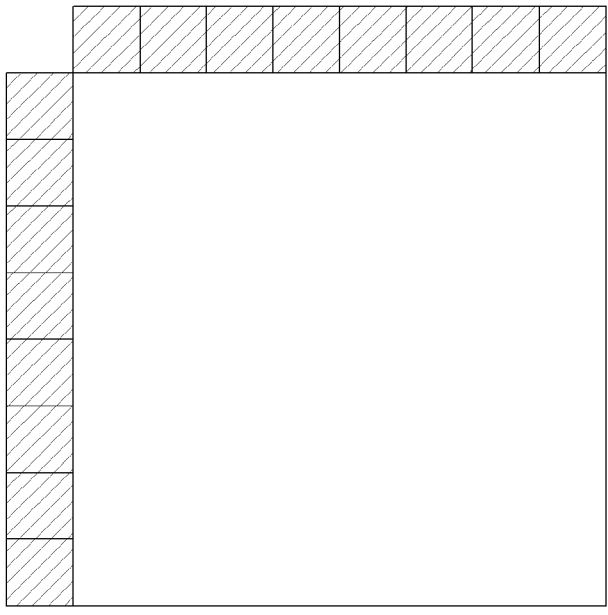
FIG. 7 shows an intra prediction method based on a DC mode according to the present disclosure.

FIG. 7 shows an intra prediction method based on a DC mode according to the present disclosure.

Referring to FIG. 7, an average value of a surrounding sample adjacent to a current block may be calculated, and a calculated average value may be configured as a prediction value of all samples in a current block. Here, a surrounding samples may include a top reference sample and a left reference sample of a current block. However, according to a shape of a current block, an average value may be calculated by using only a top reference sample or a left reference sample. As an example, when a width of a current block is greater than a height, an average value may be calculated by using only a top reference sample of a current block. Alternatively, when a ratio of a width and a height of a current block is greater than or equal to a predetermined threshold value, an average value may be calculated by using only a top reference sample of a current block. Alternatively, when a ratio of a width and a height of a current block is smaller than or equal to a predetermined threshold value, an average value may be calculated by using only a top reference sample of a current block. On the other hand, when a width of a current block is smaller than a height, an average value may be calculated by using only a left reference sample of a current block. Alternatively, when a ratio of a width and a height of a current block is smaller than or equal to a predetermined threshold value, an average value may be calculated by using only a left reference sample of a current block. Alternatively, when a ratio of a width and a height of a current block is greater than or equal to a predetermined threshold value, an average value may be calculated by using only a left reference sample of a current block.

Figure 8:
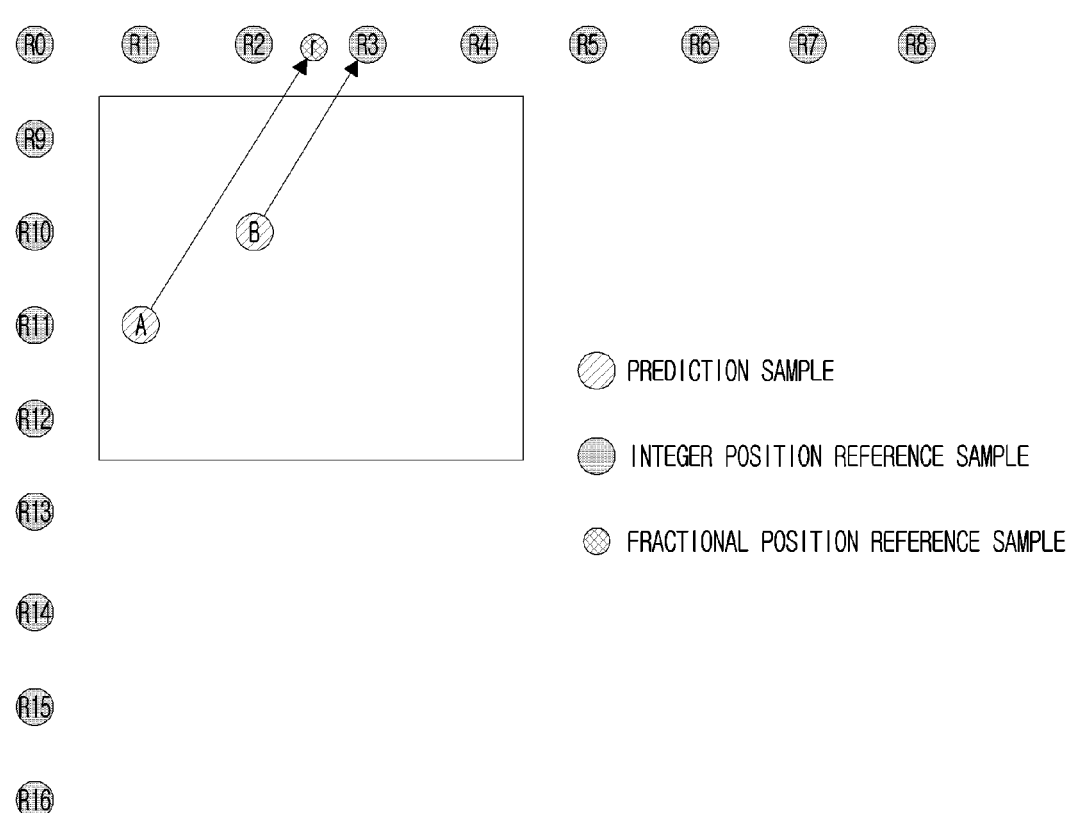
FIG. 8 shows an intra prediction method based on a directional mode according to the present disclosure.

FIG. 8 shows an intra prediction method based on a directional mode according to the present disclosure.

When an intra prediction mode of a current block is a directional mode, projection may be performed to a reference line according to an angle of a corresponding directional mode. When a reference sample exists at a projected position, a corresponding reference sample may be configured as a prediction sample of a current sample. If a reference sample does not exist at a projected position, a sample corresponding to a projected position may be generated by using one or more surrounding samples neighboring a projected position. As an example, interpolation may be performed based on two or more surrounding samples neighboring bidirectionally based on a projected position to generate a sample corresponding to a projected position. Alternatively, one surrounding sample neighboring a projected position may be configured as a sample corresponding to a projected position. In this case, among a plurality of surrounding samples neighboring a projected position, a surrounding sample closest to a projected position may be used. A sample corresponding to a projected position may be configured as a prediction sample of a current sample.

Referring to FIG. 8, for current sample B, when projection is performed to a reference line according to an angle of an intra prediction mode at a corresponding position, a reference sample exists at a projected position (i.e., a reference sample at an integer position, R3). In this case, a reference sample at a projected position may be configured as a prediction sample of current sample B. For current sample A, when projection is performed to a reference line according to an angle of an intra prediction mode at a corresponding position, a reference sample (i.e., a reference sample at an integer position) does not exists at a projected position. In this case, interpolation may be performed based on surrounding samples (e.g., R2 and R3) neighboring a projected position to generate a sample (r) at a fractional position. A generated sample (r) at a fractional position may be configured as a prediction sample of current sample A.

Figure 9:
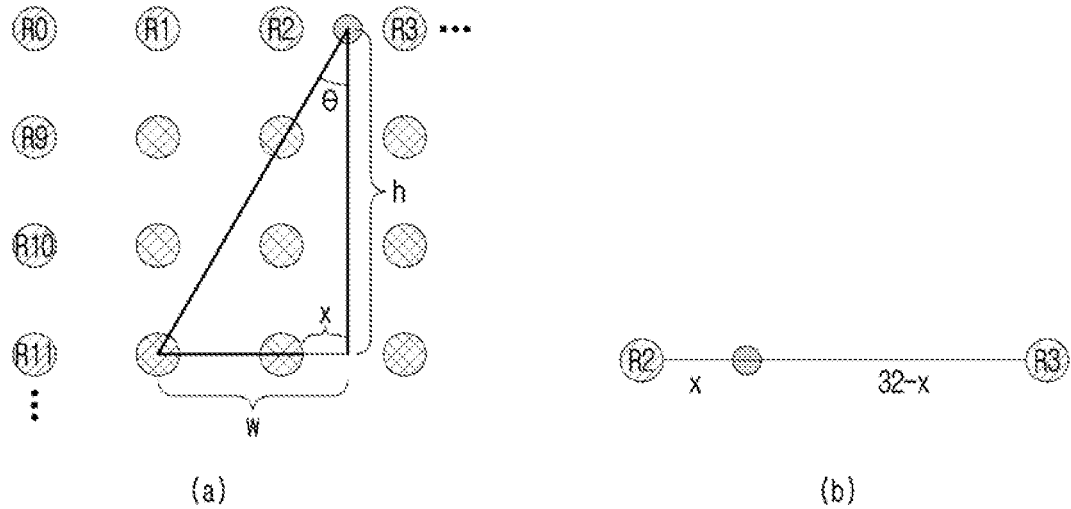
FIG. 9 shows a method for deriving a sample at a fractional position.

FIG. 9 shows a method for deriving a sample at a fractional position.

In an example of FIG. 9, variable h refers to a vertical distance (i.e., a vertical distance) from a position of prediction sample A to a reference sample line, and variable w refers to a horizontal distance (i.e., a horizontal distance) from a position of prediction sample A to a fractional position sample. In addition, variable θ refers to an angle which is predefined according to directivity of an intra prediction mode, and variable x refers to a fractional position.

Variable w may be derived as in Equation 2 below.

$$w = h\tan\theta \qquad \text{[Equation 2]}$$

Then, if an integer position is removed from variable w, finally, a fractional position may be derived.

A fractional position sample may be generated by interpolating adjacent integer position reference samples. As an example, a fractional position reference sample at a x position may be generated by interpolating integer position reference sample R2 and integer position reference sample R3.

In deriving a fractional position sample, a scaling factor may be used to avoid a real number operation. As an example, when scaling factor f is set as 32, as in an example shown in FIG. 8(b), a distance between neighboring integer reference samples may be set as 32, not 1.

In addition, a tangent value for angle θ determined according to directivity of an intra prediction mode may be also scaled up by using the same scaling factor (e.g., 32).

FIGS. 10 and 11 show that a tangent value for an angle is scaled 32 times per intra prediction mode.

FIG. 10 shows a scaled result of a tangent value for a non-wide angle intra prediction mode, and FIG. 11 shows a scaled result of a tangent value for a wide angle intra prediction mode.

If a tangent value (tan θ) for an angle value of an intra prediction mode is positive, intra prediction may be performed by using only one of reference samples belonging to a top line of a current block (i.e., top reference samples) or reference samples belonging to a left line of a current block (i.e., left reference samples). Meanwhile, when a tangent value for an angle value of an intra prediction mode is negative, both reference samples at a top position and reference samples at a left position are used.

In this case, in order to simplify implementation, left reference samples may be projected to the top or may be projected to the left to arrange reference samples in a 1D array form, and reference samples in a 1D array form may be used to perform intra prediction.

Figure 12:
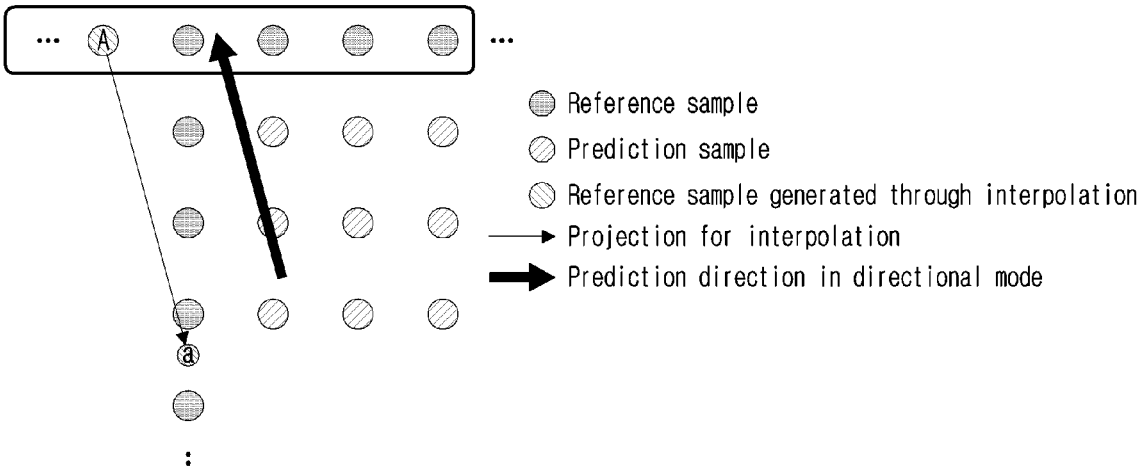
FIG. 12 is a diagram illustrating an intra prediction aspect when a directional mode is one of mode no. 34 to mode no. 49.

FIG. 12 is a diagram illustrating an intra prediction aspect when a directional mode is one of mode no. 34 to mode no. 49.

When an intra prediction mode of a current block is one of mode no. 34 to mode no. 49, intra prediction is performed by using not only top reference samples of a current block, but also left reference samples. In this case, as in an example shown in FIG. 12, a reference sample of a top line may be generated by copying a reference sample at a left position of a current block to a position of a top line or by interpolating reference samples at a left position.

As an example, when a reference sample for position A on the top of a current block is obtained, considering directivity of an intra prediction mode of a current block, projection may be performed on a left line of a current block at position A on a top line. If a projected position is called a, a value corresponding to position a may be copied or a fractional position value corresponding to a may be generated and set as a value of position A. As an example, if position a is an integer position, a value of position A may be generated by copying an integer position reference sample. On the other hand, when position a is a fractional position, a reference sample at a top position of position a and a reference sample at a bottom position of position a may be interpolated and an interpolated value may be set as a value of position A. Meanwhile, at position A on the top of a current block, a direction projected to a left line of a current block may be parallel to and opposite to a direction of an intra prediction mode of a current block.

Figure 13:
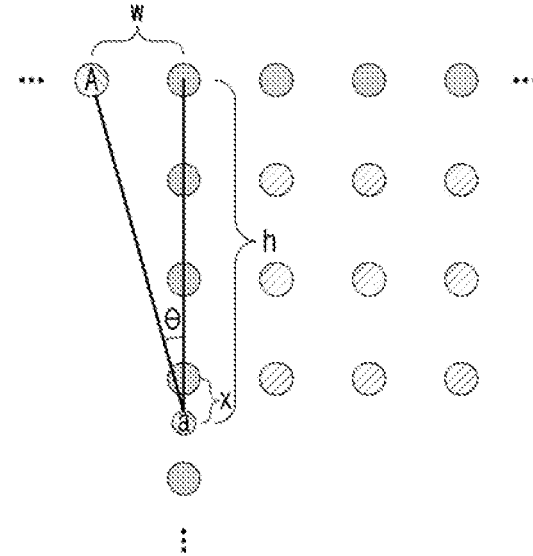
FIG. 13 is a diagram for describing an example of generating a top reference sample by interpolating left reference samples.

FIG. 13 is a diagram for describing an example of generating a top reference sample by interpolating left reference samples.

In FIG. 13, variable h represents a horizontal distance between position A on a top line and position a on a left line. Variable w represents a vertical distance between position A on a top line and position a on a left line. In addition, variable θ refers to an angle predefined according to directivity of an intra prediction mode, and variable x refers to a fractional position.

Variable h may be derived as in Equation 3 below.

$$h = w/\tan\theta \qquad \text{[Equation 3]}$$

Afterwards, if an integer position is removed from variable h, a fractional position may be derived finally.

In deriving a fractional position sample, a scaling factor may be used to avoid a real number operation. As an example, a tangent value for variable θ may be scaled by using scaling factor f1. Here, since a direction projected to a left line is parallel and opposite to a directional prediction mode, a scaled tangent value shown in FIGS. 10 and 11 may be used.

When scaling factor f1 is applied, Equation 3 may be modified and used as in Equation 4 below.

$$h = (w * f1 * f2)/f1 * \tan\theta) \qquad \text{[Equation 4]}$$

In the same way as above, a 1D reference sample array may be configured only with reference samples belonging to a top line. As a result, intra prediction for a current block may be performed by using only top reference samples composed of 1D arrays.

Figure 14:
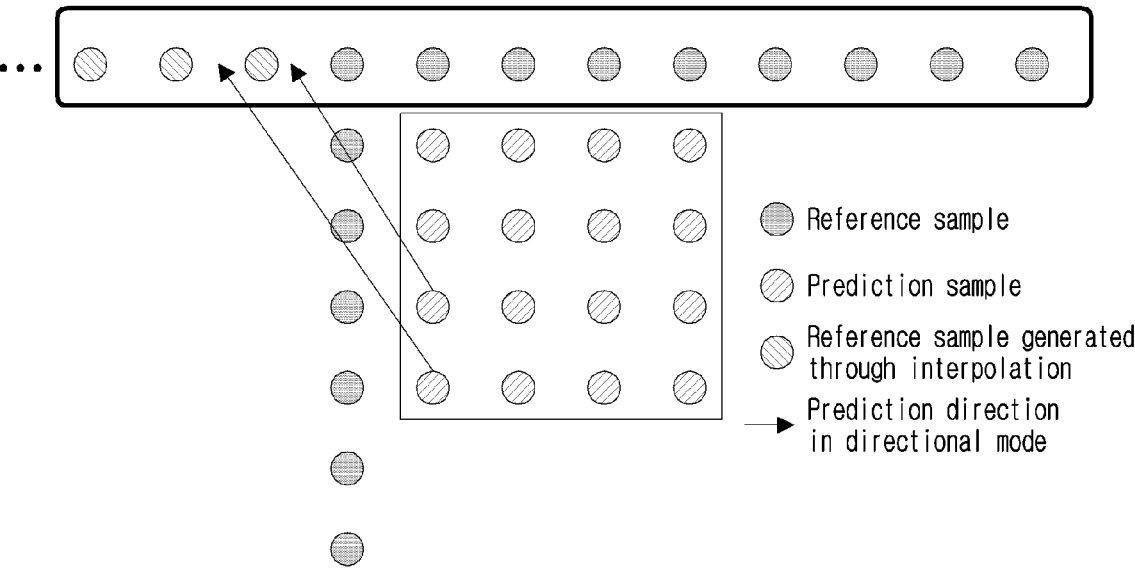
FIG. 14 shows an example in which intra prediction is performed by using reference samples arranged in a 1D array.

FIG. 14 shows an example in which intra prediction is performed by using reference samples arranged in a 1D array.

As in an example shown in FIG. 14, left reference samples may be projected to generate top reference samples, and accordingly, prediction samples of a current block may be obtained by using only reference samples belonging to a top line.

Contrary to what is shown in FIGS. 12 and 14, top reference sample may be projected to a left line to configure a 1D reference sample array only with reference samples belonging to a left line. Specifically, for mode no. 19 to no. 33 of directional modes in which a tangent value (tan θ) for an angle of a directional mode is negative, reference samples belonging to a top line may be projected to a left line to generate a left reference sample.

Prediction of a chroma block may be performed by using a reconstructed luma block. As above, prediction using a different color component may be called inter-component prediction.

Figure 15:
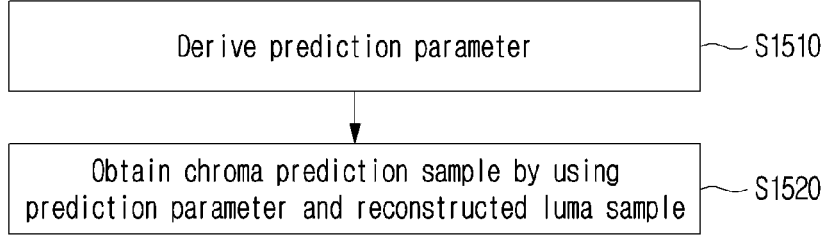
FIG. 15 is a flowchart showing a method for predicting a chroma block by using a reconstructed luma block.

FIG. 15 is a flowchart showing a method for predicting a chroma block by using a reconstructed luma block.

Referring to FIG. 15, first, for prediction of a chroma block, a prediction parameter may be derived S1510. In this case, a prediction parameter may be derived in a different way according to an image format of a picture. An image format shows a chroma sub-sampling rate, and it may be determined as one of 4:4:4, 4:2:2 or 4:2:0.

If an image format is not 4:4:4, a luma block may be down-sampled and adjusted to match a size of a chroma block.

Figure 16:
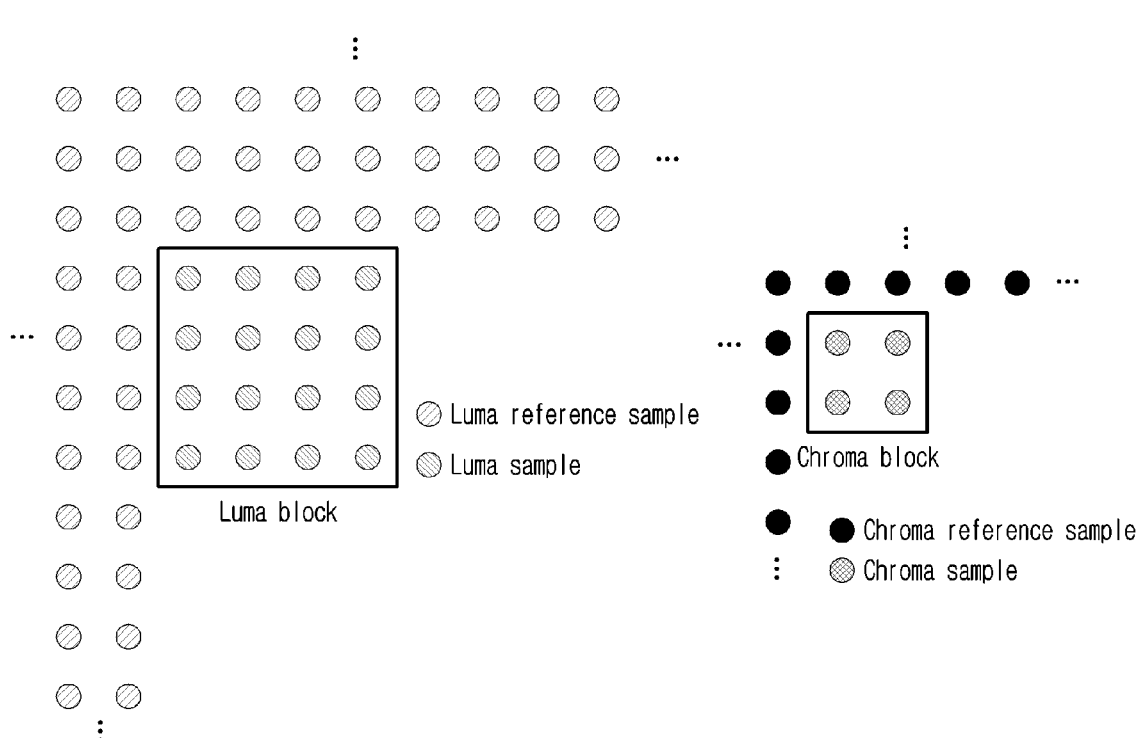
Figure 17:
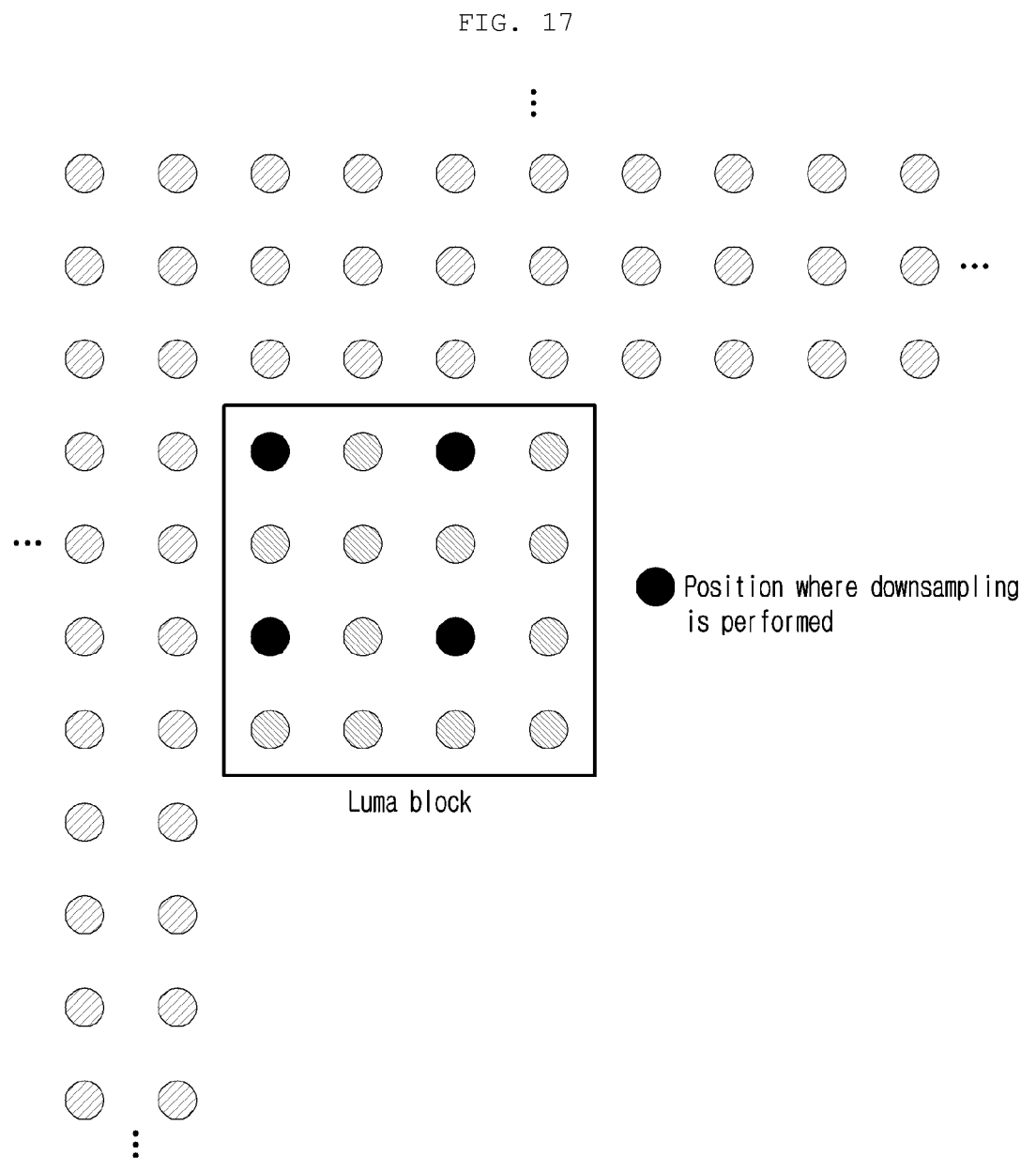
Figure 18:
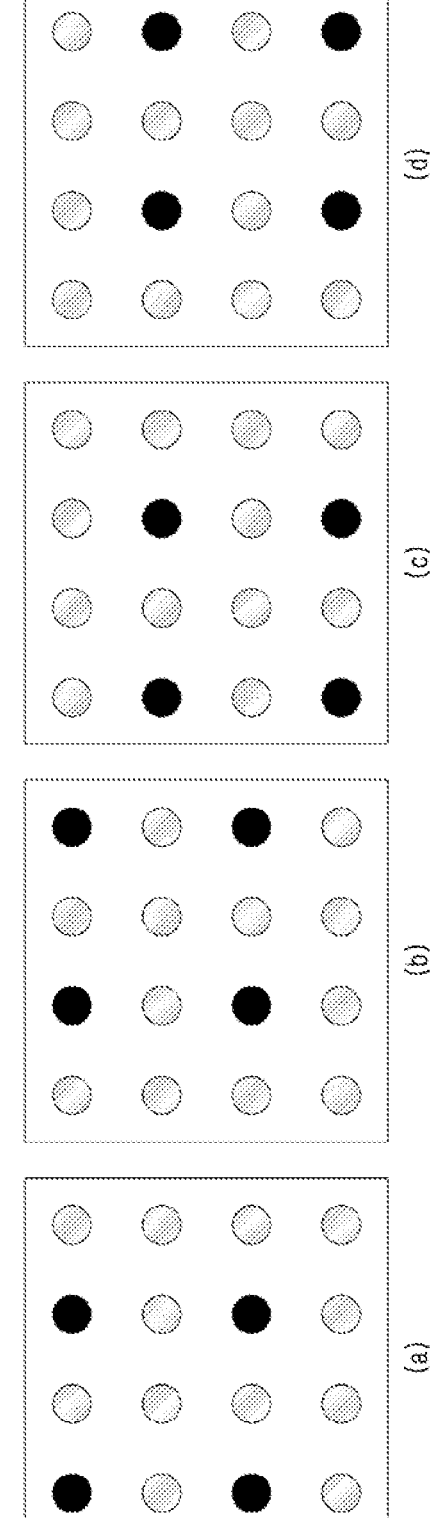

FIGS. 16 to 18 show an example in which a luma block is down-sampled.

For convenience of a description, it is assumed that an image format is 4:2:0.

When an image format is 4:2:0, as in an example shown in FIG. 16, a size of a chroma block corresponding to a 4×4-sized luma block is 2×2. In this case, a 4×4-sized luma block may be reduced to a 2×2 size by applying a down-sampling filter to a luma block. Equation 5 below shows an application aspect of a down-sampling filter.

$$\text{Downsampled\_Luma}[w][h] = \qquad \text{[Equation 5]}$$
$$(\text{Luma}[2*w][2*h-1] + \text{Luma}[2*w-1][2*h] +$$
$$4*\text{Luma}[2*w][2*h] + \text{Luma}[2*w+1][2*h] +$$
$$\text{Luma}[2*w][2*h+1] + 4) \gg 3$$

In Equation 5, Down-sampled_Luma refers to a sample value within a down-sampled luma block, and Luma refers to a value of a luma sample before down-sampling. For example, Luma[0][0] may represent a position of a top-left sample in a luma block before down-sampling. Since a size of a down-sampled luma block is 2×2, variables w and h representing a coordinate of a sample may have a value of 0 to 1, respectively.

When a down-sampling filter is applied according to Equation 5, a value of a down-sampled luma sample may be obtained by applying a cross-shaped down-sampling filter to luma samples. As an example, a value of a down-sampled luma sample at a position of (0, 0) may be obtained by applying a down-sampling filter to a luma sample at a position of (0, 0), a top luma sample at the position of (0, 0), a left luma sample at the position of (0, 0), a bottom luma sample at the position of (0, 0) and a right luma sample at the position of (0, 0).

A down-sampling filter in a shape different from that shown in FIG. 17 may be applied. As an example, a down-sampled luma sample may be obtained by applying a 1D filter, a rectangular filter or a square filter. A 1D filter may be in a size of 1×3 or 3×1, a rectangular filter may be in a size of 2×3 or 3×2 and a square filter may be in a size of 2×2 or 3×2.

A shape of a filter may be predefined in an encoder and a decoder.

Alternatively, a shape of a filter may be adaptively determined based on at least one of a size/a shape of a current block, an intra prediction mode applied to a luma block, whether a position of a chroma sample matches a position of a luma sample or an image format.

Alternatively, information indicating one of a plurality of filter candidates may be encoded and signaled.

Alternatively, according to a down-sampling position, a filter type may be different. As an example, a 1D filter or a rectangular filter may be applied to a luma sample positioned at a boundary of a luma block, while a cross-shaped filter may be applied to a luma sample not positioned at a boundary of a luma block.

As shown in FIG. 17, a down-sampling filter may be applied to a position where both a x-axis coordinate and a y-axis coordinate are an even number.

An application position of a down-sampling filter may be set differently from that shown in FIG. 17. FIG. 18 shows a variety of examples for an application position of a down-sampling filter.

After predefining a plurality of candidates related to a down-sampling application position, one of a plurality of candidates may be selected. As an example, after defining examples of FIG. 18(a) to FIG. 18(d) as a plurality of candidates, index information indicating one of a plurality of examples may be encoded and signaled.

Alternatively, one of a plurality of candidates may be selected based on whether a position of a chroma sample matches a position of a luma sample.

A down-sampling filter may be also applied to reference samples around a luma block. Specifically, a down-sampled luma reference sample may be obtained by applying a down-sampling filter to at least one of a top reference region adjacent to the top of a luma block or a left reference region adjacent to the left.

The same number of down-sampled luma reference samples as the number of reference samples included in a reference region of a chroma block may be obtained.

Meanwhile, an inter-component prediction mode may be divided into a top inter-component prediction mode, a left inter-component prediction mode and a top and left inter-component prediction mode according to a configuration of a reference region. When a top inter-component prediction mode is selected, a reference region of a luma block and a chroma block is composed of only a top reference region. When a left inter-component prediction mode is selected, a reference region of a luma block and a chroma block is composed of only a left reference region. When a top and left inter-component prediction mode is selected, a reference region of a luma block and a chroma block may be composed of a top reference region and a left reference region.

Information indicating which of a top inter-component prediction mode, a left inter-component prediction mode and a top and left inter-component prediction mode is applied to a current block may be explicitly encoded and signaled. As an example, index information indicating a type of an inter-component prediction mode may be encoded and signaled.

Alternatively, based on at least one of a size/a shape of a current block, whether a current block borders a boundary of a CTU or a picture or an intra prediction mode applied to a luma block, one of a top inter-component prediction mode, a left inter-component prediction mode and a top and left inter-component prediction mode may be selected.

For convenience of a description, in an embodiment described later, it is assumed that a reference region of a luma block and a chroma block includes a top reference region and a left reference region.

A shape of a down-sampling filter applied to a reference region of a luma block may be the same as a down-sampling filter applied to a luma block. Alternatively, a shape of a down-sampling filter applied to a reference region of a luma block may be different from a down-sampling filter applied to a luma block. Alternatively, a shape of a down-sampling filter applied to a top reference region of a luma block may be different from a shape of a down-sampling filter applied to a left reference region of a luma block.

Meanwhile, a position where down-sampling is applied within a reference region may be predefined in an encoder and a decoder.

As another example, a decoder may determine for itself a position where down-sampling is applied in a reference region in the same way as an encoder.

Figure 19:
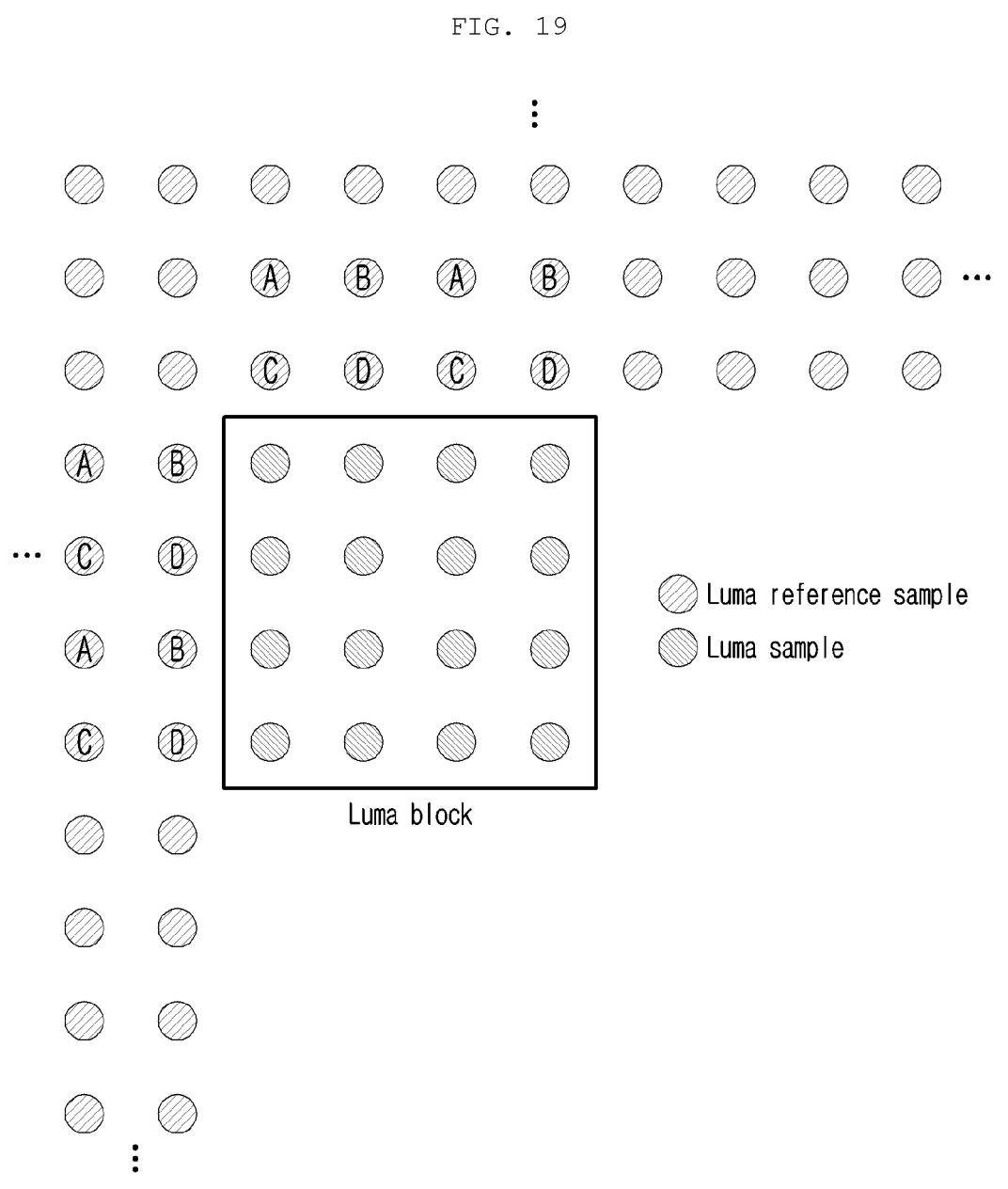

FIG. 19 is a diagram for describing an example related to a position where down-sampling is applied.

When an image format is 4:2:0, a 1×1-sized chroma block corresponds to a 2×2-sized luma block. Accordingly, a down-sampling filter may be applied to one position of four luma reference samples to derive a down-sampled luma reference sample corresponding to a chroma reference sample.

When four luma reference samples corresponding to one chroma reference sample are referred to as A to D, a cost for each position may be calculated after performing down-sampling on each of positions A to D in a reference region. Here, a cost for a specific position may be derived based on a sum of differences between a down-sampled luma reference sample obtained by applying a down-sampling filter centered on a corresponding position and a chroma reference sample corresponding to a corresponding position or a sum of absolute values of the difference. As such, a cost derived based on a sum of absolute values of a difference may be called Sum of Difference (SAD).

Afterwards, a position with the lowest cost is determined as an optimal position, and a process of deriving a prediction parameter which will be described later may be performed by using down-sampled luma samples at an optimal position.

Alternatively, information indicating one of a plurality of positions to which a down-sampling filter may be applied may be encoded and signaled. As an example, in an example shown in FIG. 19, an index indicating one of positions A to D may be encoded and signaled. To this end, an encoder may obtain a prediction parameter for each of a plurality of positions to which a down-sampling filter may be applied and may encode and signal an index indicating a position used to derive an optimal prediction parameter among a plurality of prediction parameters. Here, an optimal prediction parameter may represent Rate Distortion Optimization (RDO) or a cost of each prediction parameter.

Meanwhile, determining an optimal down-sampling application position within a top reference region may be independent of determining an optimal down-sampling application position within a left reference region. In this case, an optimal down-sampling application position within a top reference region may be different from an optimal down-sampling application position within a left reference region.

Down-sampled luma reference samples and reference samples of a chroma block may be used to derive a prediction parameter for a chroma block. A prediction parameter may include weight $\alpha$ and offset $\beta$. A prediction parameter may be derived by using a least square method, etc.

As an example, weight $\alpha$ and offset $\beta$ may be derived based on the linearity of the maximum value and the minimum value of down-sampled luma reference samples and the maximum value and the minimum value of chroma reference samples.

In this case, a prediction parameter may be derived by using only chroma reference samples at a predefined position and down-sampled luma reference samples corresponding thereto. In this case, a process of deriving a prediction parameter may be simplified, reducing complexity in an encoder and a decoder. As an example, a prediction parameter may be derived by using chroma reference samples at a position illustrated in Equation 6 below.

$$(-1, W/4), (-1, 3W/4), (H/4, -1), (3H/4, -1) \qquad \text{[Equation 6]}$$

In the example, W and H represent a width and a height of a chroma block, respectively. According to the example, a prediction parameter may be derived by using four chroma reference samples and four down-sampled luma reference samples corresponding thereto.

A prediction parameter may be also obtained by using reference samples at a position different from the example.

As an example, a position of reference samples may be determined as in Equation 7 and Equation 8 below.

$$(-1, W/4), (-1, 3W/4), (-1, 5W/4), (-1, 7W/4) \quad \text{[Equation 7]}$$

$$(H/4, -1), (3H/4, -1), (5H/4, -1), (7H/4, -1) \quad \text{[Equation 8]}$$

After predefining a plurality of candidates for a position of reference samples, one of a plurality of candidates may be selected. As an example, after each of examples of Equation 6 to Equation 8 listed above is set as a position candidate, reference samples may be selected according to one of a plurality of position candidates.

Information for selecting one of a plurality of position candidates may be encoded and signaled. As an example, an index indicating one of a plurality of position candidates may be encoded and signaled.

Alternatively, one of a plurality of position candidates may be adaptively selected based on at least one of a size/a shape of a current block, a color format or whether a position of a chroma sample matches a position of a luma sample.

As an example, if a current block is square, a prediction parameter may be derived by using a position candidate in Equation 6. On the other hand, if a current block is non-square, a prediction parameter may be derived by using a position candidate in Equation 7 or Equation 8. As an example, if a current block has a non-square shape that a width is greater than a height, a position candidate in Equation 7 may be used, and if a current block has a non-square shape that a height is greater than a width, a position candidate in Equation 8 may be used.

Once a prediction parameter is derived, a prediction sample of a chroma block may be obtained based on a down-sampled luma sample S1520. As an example, a prediction sample of a chroma block may be obtained according to Equation 9 below.

$$PredChroma[w][h] = \alpha \times \text{Downsampled\_luma}[w][h] + \beta, \quad \text{[Equation 9]}$$

$$0 \le w < W, 0 \le h < H$$

In Equation 9, PredChroma represents a prediction sample of a chroma block, and Down-sampled_Luma represents a down-sampled luma sample at a position corresponding to a chroma prediction sample.

Meanwhile, if an image format is 4:4:4, the above-described down-sampling process may be omitted. In other words, if an image format is 4:4:4, a process of performing down-sampling on reconstructed samples within a luma block and a process of performing down-sampling on reference samples of a luma block may be omitted.

As another example, regardless of an image format, a down-sampling filter may not be applied to a reference region of a luma block. In other words, when deriving a prediction parameter, instead of using the minimum value and the maximum value among down-sampled luma reference samples, the minimum value and the maximum value among luma reference samples may be used.

In an example described later, a luma reference sample may refer to a down-sampled luma reference sample or a luma reference sample to which a down-sampling filter is not applied according to whether a down-sampling filter is applied to a reference region of a luma block.

Instead of using a prediction parameter derived by using luma reference samples and chroma reference samples as a final prediction parameter, a final prediction parameter may be derived by adjusting a derived prediction parameter.

Specifically, a prediction parameter derived by using luma reference samples and chroma reference samples may be set as a prediction value of a prediction parameter (i.e., an initial prediction parameter). Afterwards, a final prediction parameter (i.e., an adjusted prediction parameter) may be derived by adding a difference value of a prediction parameter to a prediction value of a prediction parameter.

As an example, weight $\alpha$ obtained based on luma reference samples and chroma reference samples may be set as a weight prediction value and a weight difference value may be added to the weight prediction value to derive final weight $\alpha'$. Furthermore, offset $\beta$ obtained based on luma reference samples and chroma reference samples may be set as an offset prediction value and an offset difference value may be added to the offset prediction value to derive final offset $\beta'$.

Information on a weight difference value and an offset difference value may be encoded and signaled, respectively. As an example, first parameter offset information showing a weight difference value and second parameter offset information showing an offset difference value may be encoded and signaled, respectively.

Alternatively, only a single parameter adjustment offset may be explicitly encoded and signaled, and a weight difference value and an offset difference value may be derived based on the parameter adjustment offset. Equation 10 below shows an example of deriving a final prediction parameter for a chroma block.

$$\alpha' \alpha + \text{oft} \quad \text{[Equation 10]}$$

$$\beta' = \beta - (\text{off} \times Ym)$$

In Equation 10, off represents a parameter adjustment offset. A parameter adjustment offset may be explicitly encoded and signaled. $\alpha$ represents a weight prediction value, and $\alpha'$ represents a final weight. $\beta$ represents an offset prediction value, and $\beta'$ represents a final offset. Ym represents an average value of luma reference samples.

A median value, the minimum value or the maximum value of luma reference samples may be also set as variable Ym.

Figure 20:
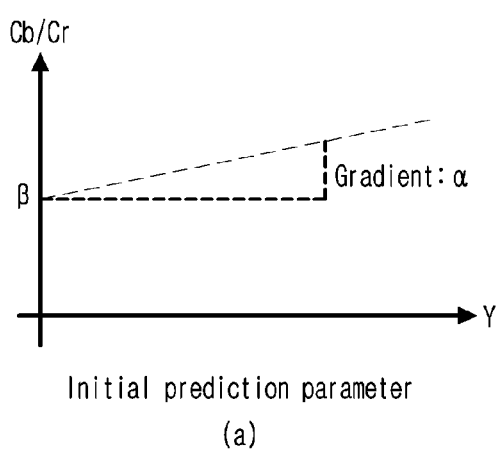
FIG. 20 shows an example in which a prediction parameter derived based on luma reference samples and chroma reference samples is adjusted.
Figure 20:
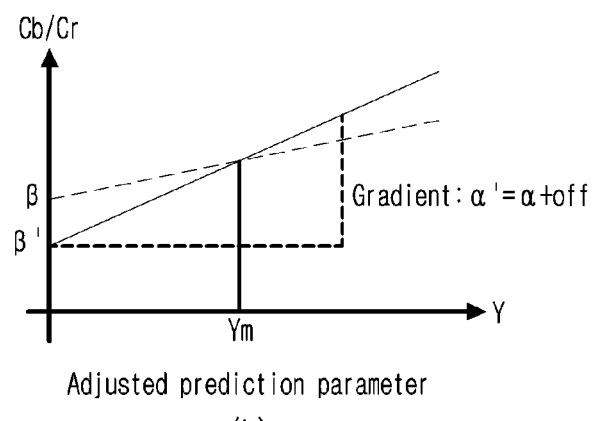

FIG. 20 shows an example in which a prediction parameter derived based on luma reference samples and chroma reference samples is adjusted.

FIG. 20(a) shows a prediction parameter derived based on luma reference samples and chroma reference samples. FIG. 20(b) shows a result of adjusting a prediction parameter shown in FIG. 20(a) based on a parameter adjustment offset.

A value of a parameter adjustment offset may be encoded and signaled as it is.

As another example, after predefining a plurality of parameter adjustment offset value candidates, information indicating a parameter adjustment offset value applied to a current block may be encoded and signaled. The information may be an index indicating one of a plurality of candidates. As an example, in an encoder and a decoder, a plurality of candidates with a configuration such as (−4, −3, −2, −1, 0, 1, 2, 3, 4) may be predefined.

Alternatively, at least one of the number or type of parameter adjustment offset value candidates that may be selected by a current block may be determined based on at least one of a size/a shape of a current block, a quantization parameter of a current block, an intra prediction mode of a luma block, whether a luma block is encoded by an intra mode or an inter mode, an image format, the number of reference samples used to derive a prediction parameter, a difference between the maximum (or minimum) value of down-sampled luma reference samples and the maximum (or minimum) value of chroma reference samples or a bit depth of a sample.

As an example, a plurality of parameter adjustment offset candidate sets may be predefined in an encoder and a decoder. Each of a plurality of parameter adjustment offset candidate sets may include a plurality of parameter adjustment offset candidates. In this case, among parameter adjustment offset candidate sets, at least one of the number or type of parameter adjustment offset candidates may be different.

As an example, a first parameter adjustment offset candidate set may be configured like (−4, −3, −2, −1, 0, 1, 2, 3, 4), a second parameter adjustment offset candidate set may be configured like (−7, −5, −3, −1, 0, 1, 3, 5, 7), and a third parameter adjustment offset candidate set may be configured like (−8, −6, −4, −2, 0, 2, 4, 6, 8).

Based on conditions listed above, one of a plurality of parameter adjustment offset candidate sets may be selected for a current block. As an example, when a difference between the maximum value (or the minimum value) of down-sampled luma reference samples and the maximum value (or the minimum value) of chroma reference samples is greater than a first threshold value, a first parameter adjustment offset candidate set may be selected, and when the difference is not greater than a first threshold value, but is greater than a second threshold value, a second parameter adjustment offset candidate set may be selected. When the difference is also not greater than a second threshold value, a third parameter adjustment offset candidate set may be selected.

Alternatively, information indicating one of a plurality of parameter adjustment offset candidate sets may be encoded and signaled. The information may be an index indicating one of a plurality of parameter adjustment offset candidate sets.

Afterwards, a parameter adjustment offset candidate of a current block may be selected among parameter adjustment offset candidates included in a selected parameter adjustment offset candidate set.

The number of parameter adjustment offset candidate sets may be different from that described. In other words, in the above-described example, three parameter adjustment offset candidate sets were illustrated, but there may be fewer or more parameter adjustment offset candidate sets.

In addition, a configuration of parameter adjustment offset candidate sets is not limited to a described example. As an example, a parameter adjustment offset value may be a value expressed as exponentiation of 2. In this case, parameter adjustment offset candidate sets may be composed of values expressed as exponentiation of 2.

Alternatively, parameter adjustment offset candidate sets may be composed of values corresponding to an exponent (i.e., N) of a value expressed as exponentiation of 2 (i.e., $2^N$). In this case, a parameter adjustment offset value may be obtained by shifting constant 1 to the left by a value indicated by a candidate selected from a parameter adjustment offset candidate set.

According to a sample value, luma reference samples may be classified into a plurality of groups, and a prediction parameter may be derived individually for each group. As an example, if an average value of luma reference samples is Ym, among luma reference samples, some with a value greater than variable Ym may be classified into a first group and others may be classified into a second group. A luma reference sample and a chroma reference sample at the same position are classified in the same manner as a classification result of luma reference samples. As an example, when a luma reference sample is classified into a first group, a chroma reference sample corresponding to the luma reference sample is also classified into a first group.

Afterwards, a first prediction parameter may be derived by using chroma reference samples belonging to a first group and luma reference samples belonging to a first group, and a second prediction parameter (e.g., weight $\alpha 2$ and offset $\beta 2$) may be derived by using chroma reference samples belonging to a second group and luma reference samples belonging to a second group.

According to whether a value of a luma sample corresponding to a chroma sample to be predicted belongs to a first group or a second group, a chroma prediction sample may be obtained by using a first prediction parameter or a second prediction parameter. As an example, if a luma sample corresponding to a chroma sample to be predicted belongs to a first group, a chroma prediction sample may be obtained based on Equation 11 below.

$$PredChroma[w][h] = \alpha 1 \times Downsampled\_Luma[w][h] + \beta 1 \quad \text{[Equation 11]}$$
$$Downsampled\_Luma[w][h] < Ym$$

If a luma sample corresponding to a chroma sample to be predicted belongs to a second group, a chroma prediction sample may be obtained based on Equation 12 below.

$$PredChroma[w][h] = \alpha 2 \times Downsampled\_Luma[w][h] + \beta 2, \quad \text{[Equation 12]}$$
$$Downsampled\_Luma[w][h] < Ym$$

A parameter adjustment offset may be used when deriving a prediction parameter per group. In this case, a prediction parameter for each group may be adjusted by a parameter adjustment offset.

Figure 21:
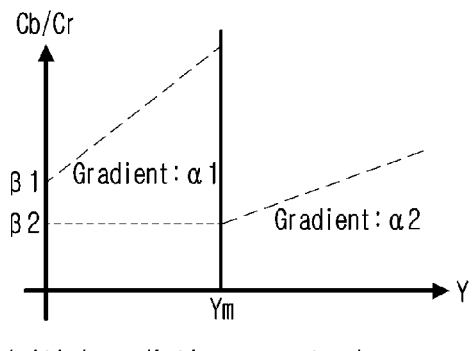
FIG. 21 shows an example in which a prediction parameter is adjusted per group.
Figure 21:
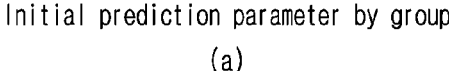
Figure 21:
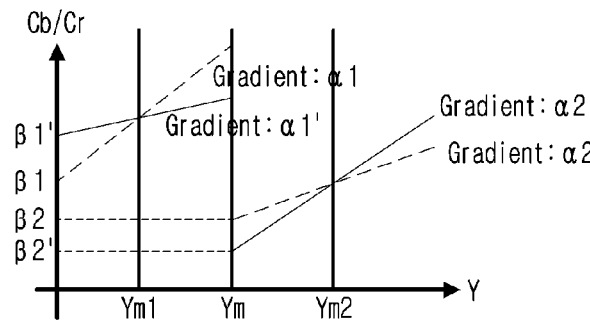

FIG. 21 shows an example in which a prediction parameter is adjusted per group.

A first prediction parameter may be adjusted based on average value Ym1 of luma reference samples belonging to a first group, and a second prediction parameter may be adjusted based on average value Ym2 of luma reference samples belonging to a second group.

Information on a parameter adjustment offset may be encoded and signaled per group.

Alternatively, information on a parameter adjustment offset may be signaled at a level of a block (e.g., a coding block). In this case, each group may share information on a parameter adjustment offset signaled at a level of a block. In other words, a parameter adjustment offset between groups may be the same.

Alternatively, information on a parameter adjustment offset may be encoded and signaled at a level of a block, while information on a difference value of a parameter adjustment offset may be encoded and signaled per each group. In this case, a parameter adjustment offset of a specific group may be derived by adding a parameter adjustment offset differential value signaled for a corresponding group to a parameter adjustment offset signaled at a level of a block.

Alternatively, a parameter adjustment offset may be encoded and signaled for a first group among a plurality of groups, and a difference value with a parameter adjustment offset of a first group may be encoded and signaled for a second group.

In the above-described embodiments, it was described that adjustment of a prediction parameter includes adjustment of a weight and adjustment of an offset. Unlike a description, only a weight or only an offset of a prediction parameter may be adjusted. As an example, in an example of Equation 10, only adjusting a weight by using a parameter adjustment offset may be applied or only adjusting an offset by using a parameter adjustment offset may be applied.

In embodiments described by FIG. 19, it was illustrated that one of positions to which a down-sampling filter may be applied is selected based on a cost or one of positions to which a down-sampling filter may be applied is selected based on signaled information.

Unlike a description, a prediction parameter may be obtained by applying a down-sampling filter to each of positions to which a down-sampling filter may be applied. As an example, a first prediction parameter may be obtained based on down-sampled luma reference samples derived by applying a down-sampling filter to position A, and a second prediction parameter may be obtained based on down-sampled luma reference samples derived by applying a down-sampling filter to position B.

Reference samples for intra prediction of a chroma block may be obtained based on a reconstructed luma sample, and intra prediction of a chroma block may be performed by using an obtained reference sample. Specifically, based on a reconstructed luma sample, at least one of right reference samples or bottom reference samples of a chroma block may be derived.

Figure 22:
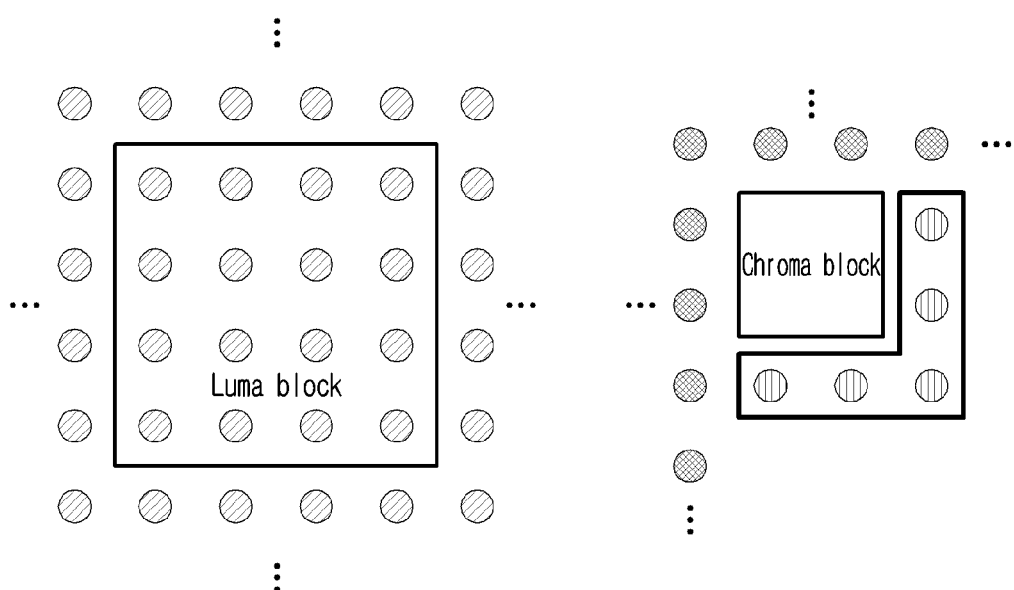
FIG. 22 shows an example in which right reference samples and bottom reference samples of a chroma block are derived.

FIG. 22 shows an example in which right reference samples and bottom reference samples of a chroma block are derived.

According to encoding/decoding order, a reconstructed sample does not exist on the right and bottom of a chroma block. On the other hand, since a luma block is encoded/decoded before a chroma block, a reconstructed sample may exist on the right and bottom of a luma block. Accordingly, at least one of a right reference sample or a bottom reference sample of a chroma block may be derived by using a reconstructed luma sample.

As an example, a reconstructed luma sample or a down-sampled luma sample corresponding to a right or bottom reference sample may be set as a value of a right or bottom reference sample.

Alternatively, after deriving a prediction parameter (i.e., weight $\alpha$ and offset $\beta$) by using at least one of a top reference region or a left reference region of a luma block, a right or bottom reference sample may be derived based on a derived prediction parameter. Specifically, a right or bottom reference sample may be derived by applying weight $\alpha$ and offset $\beta$ to a reconstructed luma sample or a down-sampled luma sample corresponding to a right or bottom reference sample.

Meanwhile, when right and/or bottom reference samples are used, intra prediction may be performed by using more directional modes than shown in FIG. 4. As an example, one of directional modes opposite to directional modes shown in FIG. 4 may be applied to intra prediction of a chroma block. In other words, as in this embodiment, when right and bottom reference samples are generated for a chroma block, the number of directional modes available for a chroma block may be greater than the number of directional modes available for a luma block.

Meanwhile, a chroma prediction sample may be obtained by applying a convolution filter to a reconstructed luma block. Whether to obtain a chroma prediction sample by applying a convolution filter may be adaptively determined based on at least one of a size/a shape of a current block, an intra prediction mode of a luma block, an image format or the number of reference samples included in a reference region.

Alternatively, predicting a chroma block by using a convolution filter may be defined as one of inter-component prediction modes. In this case, based on index information, whether predicting a chroma block by using a convolution filter among a plurality of inter-component prediction modes is selected may be determined.

A convolution filter may have a size of 7 taps or 5 taps. A convolution filter may be applied to a luma sample at the same position as a chroma sample to be predicted and at least one adjacent luma sample adjacent to the luma sample.

Equation 13 shows an example in which a chroma prediction sample is obtained by applying a convolution filter.

$$PredChroma = c_0 C + c_1 N + c_2 S + c_3 E + c_4 W + c_5 P + c_6 B \quad \text{[Equation 13]}$$

In Equation 13 above, C represents a luma sample at the same position as a chroma prediction sample. N represents a top luma sample adjacent to the top of the luma sample, S represents a bottom luma sample adjacent to the bottom of the luma sample, E represents a right luma sample adjacent to the right of the luma sample and W represents a left luma sample adjacent to the left of the luma sample.

P may be obtained by raising a luma sample at the same position as a chroma prediction sample. As an example, P may be derived as in Equation 14 below.

$$P = (C * C + midVal) \gg bitDepth \quad \text{[Equation 14]}$$

In Equation 14 above, midVal represents a median value of a sample expression range by a bit depth.

B represents an offset value. As an example, B may be set as a median value (i.e., midVal) of a sample expression range by a bit depth.

Meanwhile, if there is an unavailable luma sample among luma samples indicated by N, S, E and W, a chroma prediction sample may be obtained by erasing an unavailable luma sample and a luma sample in an opposite direction from Equation 13 above. As an example, if a luma sample at position N is unavailable (e.g., beyond a boundary of a picture), a chroma prediction sample may be derived by erasing terms including N and S from the Equation.

A term of syntaxes used in the above-described embodiments is just named for convenience of a description.

When embodiments described based on a decoding process or an encoding process are applied to an encoding process or a decoding process, it is included in a scope of the present disclosure. When embodiments described in predetermined order are changed in order different from a description, it is also included in a scope of the present disclosure.

The above-described embodiment is described based on a series of steps or flow charts, but it does not limit a time series order of the present disclosure and if necessary, it may be performed at the same time or in different order. In addition, each component (e.g., a unit, a module, etc.) configuring a block diagram in the above-described embodiment may be implemented as a hardware device or software and a plurality of components may be combined and implemented as one hardware device or software. The above-described embodiment may be recorded in a computer readable recoding medium by being implemented in a form of a program instruction which may be performed by a variety of computer components. The computer readable recoding medium may include a program instruction, a data file, a data structure, etc. solely or in combination. A hardware device which is specially configured to store and perform magnetic media such as a hard disk, a floppy disk and a magnetic tape, optical recording media such as CD-ROM, DVD, magneto-optical media such as a floptical disk and a program instruction such as ROM, RAM, a flash memory, etc. is included in a computer readable recoding medium. The hardware device may be configured to operate as one or more software modules in order to perform processing according to the present disclosure and vice versa.

INDUSTRIAL AVAILABILITY

Embodiments through the present disclosure may be applied to an electronic device which encodes/decodes an image.

The invention claimed is:

1. A method of decoding an image, the method comprising:
deriving an initial prediction parameter for a chroma block;
adjusting the initial prediction parameter; and
based on the adjusted prediction parameter and a reconstructed luma block, obtaining a prediction block for the chroma block.

2. The method of claim 1, wherein:
the adjusted prediction parameter is derived through a parameter adjustment offset.

3. The method of claim 2, wherein:
the initial prediction parameter includes an initial weight, and
an adjusted weight is derived by adding the parameter adjustment offset to the initial weight.

4. The method of claim 3, wherein:
the initial prediction parameter further includes an initial offset, and
the adjusted weight is derived by adding a difference value obtained by multiplying an average value, a minimum value, a maximum value or a median value of the luma reference samples and the parameter adjustment offset to the initial weight.

5. The method of claim 2, wherein:
the parameter adjustment offset is determined based on an index indicating one of a plurality of parameter adjustment offset candidates, and the index is explicitly signaled through a bitstream.

6. The method of claim 5, wherein:
when one of a plurality of parameter adjustment offset candidate sets is selected for a current block, the parameter adjustment offset is selected from the plurality of parameter adjustment offset candidates included in the selected parameter adjustment offset candidate set, and
the one of the plurality of parameter adjustment offset candidate sets is selected based on at least one of a size, a shape, a quantization parameter or an image format of the current block.

7. The method of claim 1, wherein:
the initial prediction parameter is derived based on down-sampled luma reference samples in a reference region adjacent to the luma block and chroma reference samples in a reference region adjacent to the chroma block, and
a position where a down-sampling filter is applied in a reference region of the luma block is determined based on a cost of each position where the down-sampling filter is applicable.

8. The method of claim 7, wherein:
the down-sampled luma reference samples are classified into a plurality of groups, and
for each of the plurality of groups, the initial prediction parameter and the adjusted prediction parameter are obtained.

9. The method of claim 8, wherein:
a parameter adjustment offset is independently determined for the each of the plurality of groups.

10. A method of encoding an image, the method comprising:
deriving an initial prediction parameter for a chroma block;
adjusting the initial prediction parameter; and
based on the adjusted prediction parameter and a reconstructed luma block, obtaining a prediction block for the chroma block.

11. The method of claim 10, wherein:
the initial prediction parameter is derived based on luma reference samples adjacent to the luma block and chroma reference samples adjacent to the chroma block.

12. The method of claim 10, wherein:
the adjusted prediction parameter is derived through a parameter adjustment offset.

13. The method of claim 12, wherein:
the initial prediction parameter includes an initial weight,
an adjusted weight is derived by adding the parameter adjustment offset to the initial weight.

14. The method of claim 13, wherein:
the initial prediction parameter further includes an initial offset, and
the adjusted weight is derived by adding a difference value obtained by multiplying an average value, a minimum value, a maximum value or a median value of the luma reference samples and the parameter adjustment offset to the initial weight.

15. A computer-readable recording medium storing a bitstream generated by an image encoding method, the computer-readable recording medium comprising:
deriving an initial prediction parameter for a chroma block;
adjusting the initial prediction parameter; and
based on the adjusted prediction parameter and a reconstructed luma block, obtaining a prediction block for the chroma block.

* * * * *